United States Patent
Matsumoto

(10) Patent No.: US 10,442,947 B2
(45) Date of Patent: Oct. 15, 2019

(54) METHOD FOR MANUFACTURING COLORED PARTICLE DISPERSION

(71) Applicant: KAO CORPORATION, Tokyo (JP)

(72) Inventor: Yuuta Matsumoto, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/322,373

(22) PCT Filed: Jul. 1, 2015

(86) PCT No.: PCT/JP2015/069066
§ 371 (c)(1),
(2) Date: Dec. 27, 2016

(87) PCT Pub. No.: WO2016/002859
PCT Pub. Date: Jan. 7, 2016

(65) Prior Publication Data
US 2017/0152394 A1 Jun. 1, 2017

(30) Foreign Application Priority Data

Jul. 4, 2014 (JP) .................................. 2014-138925

(51) Int. Cl.
C09D 17/00 (2006.01)
C09D 11/322 (2014.01)
C09D 133/00 (2006.01)
C09D 133/02 (2006.01)
B41J 2/01 (2006.01)

(52) U.S. Cl.
CPC ............. C09D 17/001 (2013.01); B41J 2/01 (2013.01); C09D 11/322 (2013.01); C09D 17/00 (2013.01); C09D 133/00 (2013.01); C09D 133/02 (2013.01)

(58) Field of Classification Search
None
See application file for complete search history.

(56) References Cited

U.S. PATENT DOCUMENTS

| | | | |
|---|---|---|---|
| 7,074,843 B2 * | 7/2006 | Nakamura | B01J 13/04 523/205 |
| 2003/0097961 A1 | 5/2003 | Yatake et al. | |
| 2003/0106462 A1 * | 6/2003 | Yatake | B41J 2/14201 106/31.59 |
| 2003/0195274 A1 | 10/2003 | Nakamura et al. | |
| 2004/0229974 A1 | 11/2004 | Miyabayashi | |
| 2005/0075416 A1 | 4/2005 | Miyabayashi | |
| 2005/0239920 A1 | 10/2005 | Ono et al. | |
| 2008/0182917 A1 | 7/2008 | Miyabayashi | |
| 2009/0120325 A1 * | 5/2009 | Kyota | B82Y 30/00 106/31.65 |
| 2010/0245416 A1 | 9/2010 | Ohshima et al. | |
| 2016/0304735 A1 | 10/2016 | Matsumoto | |

FOREIGN PATENT DOCUMENTS

| | | |
|---|---|---|
| JP | 2003-82270 A | 3/2003 |
| JP | 2003-261605 A | 9/2003 |
| JP | 2003-306611 A | 10/2003 |
| JP | 2003-327862 A | 11/2003 |
| JP | 2005-97517 A | 4/2005 |
| JP | 2005-97518 A | 4/2005 |
| JP | 2005173578 A * | 6/2005 |
| JP | 2005-307028 A | 11/2005 |
| JP | 2006241303 A * | 9/2006 |
| JP | 2008-179686 A | 8/2008 |
| JP | 2008-260279 A | 10/2008 |
| JP | 2015-113458 A | 6/2015 |
| WO | WO 2001/094482 A1 | 12/2001 |

OTHER PUBLICATIONS

Machine translation of JP 2005-173578 A, retrieved Jun. 2018 (Year: 2018).*
Machine translation of JP 2006-241303 A, retrieved Feb. 2019 (Year: 2019).*
International Search Report for PCT/JP2015/069066 (PCT/ISA/210) dated Oct. 6, 2015.

* cited by examiner

*Primary Examiner* — Nicole M. Buie-Hatcher
(74) *Attorney, Agent, or Firm* — Birch, Stewart, Kolasch & Birch, LLP

(57) ABSTRACT

Colored fine-particle dispersion for ink-jet printing. The colored fine-particle dispersion is produced by subjecting dispersion including pigment, polymerizable monomer, polymerizable surfactant, and water to emulsion polymerization, including dispersing a mixed solution including the pigment, the polymerizable surfactant, the water, and an organic solvent to prepare a dispersion 1; removing the organic solvent from the dispersion 1 to prepare a dispersion 2; and subjecting the dispersion 2 and the polymerizable monomer to emulsion polymerization to obtain the colored fine-particle dispersion. The process for producing the ink includes mixing the obtained colored fine-particle dispersion and an organic solvent B. The colored fine-particle dispersion includes colored fine-particles with average particle size of 10 to 300 nm. The colored fine-particle dispersion may be used in a water-based ink for ink-jet printing, and provides high-gloss printed characters or images excellent in rub fastness when printed on a low-water absorbing recording medium.

14 Claims, No Drawings

METHOD FOR MANUFACTURING COLORED PARTICLE DISPERSION

FIELD OF THE INVENTION

The present invention relates to a process for producing a colored fine particle dispersion, the colored fine particle dispersion, and a process for producing a water-based ink for ink-jet printing which includes the colored fine particle dispersion.

BACKGROUND OF THE INVENTION

In ink-jet printing methods, droplets of ink are directly projected onto a recording medium from very fine nozzles and allowed to adhere to the recording medium to form characters or images. The ink-jet printing methods have become rapidly spread because of various advantages such as easiness of full coloration, low cost, capability of using a plain paper as the recording medium, non-contact with printed characters or images, etc. In recent years, in order to impart good weathering resistance and good water resistance to printed materials, an ink containing a pigment as a colorant has been extensively used.

On the other hand, it has been required to print characters or images on recording media for commercial printing purposes using a low-liquid absorbing coated paper such as an offset-coated paper, or a non-liquid absorbing resin film such as a polyvinyl chloride resin film, a polypropylene resin film and a polyester resin film.

It is known that when characters or images are printed on the low-liquid absorbing or non-liquid absorbing recording media by the ink-jet printing methods, there tends to occur problems such as prolonged drying time owing to slow or no absorption of liquid components of the ink, and deterioration in rub fastness of the printed characters or images early after printing. Also, it is known that unlike a plain paper in which a pigment is likely to be penetrated, the low-liquid absorbing or non-liquid absorbing recording media tend to suffer from deposition of pigment particles remaining thereon which are directly susceptible to an external force, so that the characters or images printed on these recording media tend to be deteriorated in rub fastness even after being dried.

In order to solve these conventional problems, ink-jet printing methods using recording media having an ink-absorbing layer have been proposed.

For example, JP 2008-260279A discloses an ink-jet printing method using a recording medium having a pigment-containing coating layer in which an amount of pure water transferred to a surface of the recording medium on which the coating layer is provided, and a pH value of the same surface of the recording medium are controlled to respective specific ranges, and characters or images are printed on such a surface of the recording medium using an ink containing a granular coloring material, an emulsion resin and a surfactant and having a pH value of not less than 8. In addition, JP 2008-260279A proposes a recording apparatus equipped with a drying device.

However, the improvement in recording media and recording apparatuses tends to pose problems concerning costs, consumed power, etc., and it has been therefore required to improve the composition of inks.

Further, for the purpose of stably compounding a pigment in a water-based ink, colored fine particles prepared by encapsulating the pigment with a polymer have been developed.

For example, JP 2003-306611A discloses a process for producing a microencapsulated pigment capable of producing an ink for ink-jet printing which can satisfy all of requirements (1) to (6) including (1) excellent dispersion stability; (2) excellent ejection stability from a print head; (3) capability of procuring printed materials having images with excellent fastness; (4) capability of procuring printed materials having images with high optical density; (5) capability of procuring printed materials having images with excellent scratch resistance; and (6) capability of procuring printed materials having images with high color developability which hardly suffer from ink bleeding even when using a plain paper as a recording medium, in which the pigment particles having a hydrophilic group on a surface thereof are coated with a polymer by an emulsion polymerization method.

In addition, JP 2003-261605A discloses a sulfuric acid salt containing an alkylene group having 5 to 18 carbon atoms, or an alkoxymethylethylene group and an alkylene group having 2 to 4 carbon atoms, as a polymerizable surfactant capable of providing a polymer emulsion that has good stability during polymerization thereof or provides a polymer coating film having good properties such as good water resistance. The polymer emulsion described in JP 2003-261605A can be used as a paint or an adhesive in the form of the polymer coating film.

SUMMARY OF THE INVENTION

The present invention relates to the following aspects [1] to [3]. [1] A process for producing a colored fine particle dispersion by subjecting a dispersion including a pigment, a polymerizable monomer, a polymerizable surfactant and water to emulsion polymerization, including the following steps 1 to 3:

Step 1: dispersing a mixed solution including the pigment, the polymerizable surfactant, the water and an organic solvent to prepare a dispersion 1;

Step 2: removing the organic solvent from the dispersion 1 to prepare a dispersion 2; and Step 3: subjecting the dispersion 2 and the polymerizable monomer to emulsion polymerization to obtain the colored fine particle dispersion. [2] A process for producing a water-based ink for ink-jet printing, including the step of mixing the colored fine particle dispersion produced by the process described in the above aspect [1] and an organic solvent B; and [3] A colored fine particle dispersion produced by the process described in the above aspect [1], including colored fine particles having an average particle size of not less than 10 nm and not more than 300 nm.

DETAILED DESCRIPTION OF THE INVENTION

In the conventionally known technology as described in JP 2003-306611A, although the obtained ink has good storage stability, there tend to occur such a problem that the ink is insufficient in rub fastness when printed on a recording medium that hardly absorbs water.

The present invention relates to a process for producing a colored fine particle dispersion used for a water-based ink for ink-jet printing which is capable of obtaining printed characters or images that are excellent in rub fastness when printed on a low-water absorbing recording medium and have high gloss; the colored fine particle dispersion; and a process for producing a water-based ink for ink-jet printing which includes the colored fine particle dispersion.

Meanwhile, the term "low water absorption" as used in the present invention is intended to mean both concepts of low liquid absorption and non-liquid absorption.

The present inventors have found that by dispersing a pigment with a polymerizable surfactant in a solution including water and an organic solvent and then removing the organic solvent from the resulting dispersion to subject the dispersion to emulsion polymerization, it is possible to produce a colored fine particle dispersion used for a water-based ink for ink-jet printing which is capable of obtaining printed characters or images that are excellent in rub fastness when printed on a low-water absorbing recording medium and have high gloss.

That is, the present invention relates to the following aspects [1] to [3]. [1] A process for producing a colored fine particle dispersion by subjecting a dispersion including a pigment, a polymerizable monomer, a polymerizable surfactant and water to emulsion polymerization, including the following steps 1 to 3:

Step 1: dispersing a mixed solution including the pigment, the polymerizable surfactant, the water and an organic solvent to prepare a dispersion 1;

Step 2: removing the organic solvent from the dispersion 1 to prepare a dispersion 2; and Step 3: subjecting the dispersion 2 and the polymerizable monomer to emulsion polymerization to obtain the colored fine particle dispersion. [2] A process for producing a water-based ink for ink-jet printing, including the step of mixing the colored fine particle dispersion produced by the process described in the above aspect [1] and an organic solvent B; and [3] A colored fine particle dispersion produced by the process described in the above aspect [1], including colored fine particles having an average particle size of not less than 10 nm and not more than 300 nm.

In accordance with the present invention, there are provided a process for producing a colored fine particle dispersion used for a water-based ink for ink-jet printing which is capable of obtaining printed characters or images that are excellent in rub fastness when printed on a low-water absorbing recording medium and have high gloss, and a process for producing a water-based ink for ink-jet printing which includes the colored fine particle dispersion.

[Process for Producing Colored Fine Particle Dispersion]

The production process of the present invention relates to a process for producing a colored fine particle dispersion by subjecting a dispersion including a pigment, a polymerizable monomer, a polymerizable surfactant and water to emulsion polymerization, and includes the aforementioned steps 1 to 3. The "colored fine particles" as used herein mean particles obtained by coating pigment particles with a polymer.

The process for producing the colored fine particle dispersion according to the present invention has the effect of obtaining printed characters or images that are excellent in rub fastness when printed on a low-water absorbing recording medium and have high gloss. The reason why the above advantages or effect can be attained by the present invention is considered as follows though it is not clearly determined.

That is, by using an aqueous solvent containing an organic solvent upon dispersing the pigment in water with a polymerizable surfactant, the surface of the pigment is enhanced in affinity to the aqueous solvent, so that the pigment particles are prevented from being aggregated together, and the particle size of the particles dispersed in the resulting dispersion is reduced. The reduced particle size of the pigment particles is maintained by the aid of the polymerizable surfactant even after removing the organic solvent from the dispersion, and the pigment dispersion (colored fine particle dispersion) obtained after the emulsion polymerization still contains the pigment particles having a small average particle size. For this reason, it is considered that the ink using the colored fine particle dispersion has good coating film properties, and is capable of obtaining printed characters or images having more excellent flatness as well as excellent gloss and rub fastness.

In addition, by removing the organic solvent from the dispersion after dispersing the pigment therein, it is considered that coalescence between the resin particles upon the emulsion polymerization is suppressed to thereby obtain the particles having a small average particle size.

(Step 1: Pigment Dispersing Step)

In the step 1, a mixed solution including the pigment, the polymerizable surfactant, the water and the organic solvent is dispersed to prepare a dispersion 1.

(Pigment)

The pigment used in the present invention may be either an inorganic pigment or an organic pigment.

Examples of the inorganic pigment include carbon blacks and metal oxides. In particular, carbon blacks are preferably used for black inks. The carbon blacks may include furnace blacks, thermal lamp blacks, acetylene blacks and channel blacks.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The hue of the organic pigment used in the present invention is not particularly limited, and there may be used any chromatic color pigment having a yellow color, a magenta color, a cyan color, a red color, a blue color, an orange color, a green color, etc.

The pigment used in the present invention is preferably a pigment subjected to no hydrophilic treatment from the viewpoint of improving gloss and rub fastness of the obtained printed characters or images. Meanwhile, the hydrophilic treatment of the pigment as used herein means the treatment in which at least one anionic or cationic hydrophilic functional group is bonded onto the surface of the pigment either directly or through the other atom group. Examples of the other atom group used above include an alkanediyl group having 1 to 24 carbon atoms, a substituted or unsubstituted phenylene group and a substituted or unsubstituted naphthylene group.

Examples of the anionic hydrophilic functional group include a carboxy group ($—COOM^1$), a sulfonic acid group ($—SO_3M^1$), a phosphoric acid group ($—PO_3M^1{}_2$), and an acid group such as dissociated ion forms of these groups (such as $—COO^-$, $—SO_3{}^-$, $—PO_3{}^{2-}$ and $—PO_3{}^-$ $M^1$), wherein $M^1$ is a hydrogen atom, an alkali metal, ammonium or organic ammonium.

Examples of the cationic hydrophilic functional group include an ammonium group, an amino group, etc.

(Polymerizable Surfactant)

The polymerizable surfactant used in the present invention means those surfactants referred to as a "reactive surfactant" which are capable of being copolymerized with an ethylenically unsaturated monomer, and includes anionic or nonionic surfactants containing at least one radical-polymerizable unsaturated double bond in a molecule thereof. Examples of the polymerizable surfactant include at least one surfactant selected from the group consisting of sulfosuccinic acid ester-based surfactants, alkylphenolether-based surfactants and polyoxyethylene-based surfactants.

Specific examples of commercially available products of the polymerizable surfactant include "ADEKA REASOAP" available from ADEKA Corporation, "AQUALON" available from DSK Co., Ltd., "ELEMINOL JS" and "ELEMINOL RS" both available from Sanyo Chemical Industries Ltd., and "LATEMUL PD" available from Kao Corporation.

The polymerizable surfactant used in the present invention is preferably at least one compound selected from the group consisting of compounds represented by the following general formula (I) and the following general formula (II) from the viewpoint of improving gloss and rub fastness of the printed characters or images in the resulting printed materials, and more preferably a compound (A) represented by the general formula (I) (hereinafter also referred to merely as a "compound (A)") from the viewpoint of improving gloss of the printed characters or images.

wherein BO is a butyleneoxy group; EO is an ethyleneoxy group; M is a cation; m represents an average molar number of addition of BO, and is a number of not less than 1 and not more than 10; and n represents an average molar number of addition of EO, and is a number of not less than 4 and not more than 25.

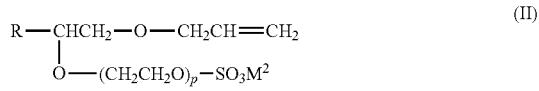

wherein $M^2$ is a cation; R is a hydrocarbon group having not less than 8 and not more than 14 carbon atoms; and p represents an average molar number of addition of ($CH_2CH_2O$), and is a number of not less than 4 and not more than 15.

Examples of the butyleneoxy group represented by BO in the formula (I) include a butane-1,2-diyloxy group, a butane-1,3-diyloxy group and a tetramethyleneoxy group. Of these butyleneoxy groups, preferred is a butane-1,2-diyloxy group.

The symbol m in the formula (I) which represents an average molar number of addition of BO is preferably not less than 2, more preferably not less than 3 and even more preferably not less than 4, and is also preferably not more than 9, more preferably not more than 8 and even more preferably not more than 7.

The symbol n in the formula (I) which represents an average molar number of addition of EO is preferably not less than 5, more preferably not less than 7, even more preferably not less than 9 and further even more preferably not less than 11, and is also not more than 25, preferably not more than 23, more preferably not more than 21 and even more preferably not more than 19.

In the formula (I), $(BO)_m$ and $(EO)_n$ are block-bonded to each other in this order.

As the cation represented by M in the formula (I), there may be mentioned at least one cation selected from the group consisting of alkali metals such as lithium, sodium and potassium; alkali earth metal ions such as calcium; a magnesium ion; an ammonium group; and organic ammonium groups such as a monomethyl ammonium group, a dimethyl ammonium group, a trimethyl ammonium group, a monoethyl ammonium group, a diethyl ammonium group, a triethyl ammonium group, a monomethanol ammonium group, a dimethanol ammonium group and a trimethanol ammonium group. Of these cations, from the viewpoint of improving stability of the colored fine particle dispersion, monovalent cations are preferred, and an ammonium group is more preferred.

The compound (A) represented by the formula (I) may be produced by conventionally known methods, for example, by the method of adding 1,2-butyleneoxide to 3-methyl-3-buten-1-ol and then adding ethyleneoxide to the obtained reaction product to obtain an ether alcohol, sulfating the obtained ether alcohol with a sulfating agent, and neutralizing the sulfated reaction product with a basic substance. Examples of the sulfating agent include chlorosulfonic acid, sulfuric anhydride and amidosulfuric acid. Of these sulfating agents, from the viewpoint of suppressing side reactions such as an addition reaction of the sulfuric acid group to the double bond group and an isomerization reaction of the double bond group, the amidosulfuric acid is preferably used.

The number of carbon atoms in the hydrocarbon group represented by R in the formula (II) is not less than 8. From the viewpoint of improving rub fastness of the obtained printed characters or images, the number of carbon atoms in R is preferably not less than 10, and is also preferably not more than 14 and more preferably not more than 12.

The symbol p in the formula (II) which represents an average molar number of addition of ($CH_2CH_2O$) is not less than 4. From the viewpoint of improving rub fastness of the printed characters or images, p is preferably not less than 5, and is also not more than 15 and preferably not more than 12.

As the cation represented by $M^2$ in the formula (II), there may be mentioned at least one cation selected from the group consisting of alkali metals such as lithium, sodium and potassium; alkali earth metal ions such as calcium; a magnesium ion; an ammonium group; and organic ammonium groups such as a monomethyl ammonium group, a dimethyl ammonium group, a trimethyl ammonium group, a monoethyl ammonium group, a diethyl ammonium group, a triethyl ammonium group, a monomethanol ammonium group, a dimethanol ammonium group and a trimethanol ammonium group. Of these cations, from the viewpoint of improving stability of the colored fine particle dispersion, monovalent cations are preferred, and an ammonium group is more preferred.

The amount of the polymerizable surfactant added in the step 1 is preferably not less than 1% by mass, more preferably not less than 5% by mass and even more preferably not less than 8% by mass, and is also preferably not more than 50% by mass, more preferably not more than 30% by mass, even more preferably not more than 20% by mass and further even more preferably not more than 15% by mass, on the basis of the pigment. When the amount of the polymerizable surfactant added in the step 1 is not less than 1% by mass, the pigment is excellent in dispersibility, and it is therefore possible to obtain a uniform pigment dispersion (dispersion 1) containing pigment particles having a small particle size. When the amount of the polymerizable surfactant added in the step 1 is not more than 30% by mass, it is possible to prevent formation of particles constituted of only the polymer that adsorbs no pigment, and suppress increase in viscosity of the resulting ink upon concentration of the ink which tends to cause ejection defects, etc.

When adding the aforementioned polymerizable surfactant, the content of the polymerizable surfactant in the dispersion in the step 1 is preferably not less than 1% by mass, more preferably not less than 5% by mass and even more preferably not less than 8% by mass, and is also preferably not more than 50% by mass, more preferably not more than 30% by mass, even more preferably not more than 20% by mass and further even more preferably not more than 15% by mass, on the basis of the pigment.

The dispersing medium used in the present invention includes water and an organic solvent.

Examples of the organic solvent include at least one compound selected from the group consisting of alcohols having not less than 1 and not more than 6 carbon atoms, ketones, ethers, amides, aromatic hydrocarbons and aliphatic hydrocarbons having not less than 5 and not more than 10 carbon atoms. Of these organic solvents, preferred are oxygen atom-containing polar solvents having not less than 1 and not more than 5 carbon atoms, more preferred is at least one compound selected from the group consisting of alcohols having not less than 1 and not more than 5 carbon atoms and ketones having not less than 1 and not more than 5 carbon atoms, and even more preferred are ketones having not less than 1 and not more than 5 carbon atoms. Specific examples of the organic solvent include at least one compound selected from the group consisting of methanol, ethanol, acetone and methyl ethyl ketone. Of these organic solvents, from the viewpoint of improving gloss and rub fastness of the printed characters or images, methyl ethyl ketone is preferred.

The proportion between water and the organic solvent in the dispersing medium is not particularly limited. From the viewpoint of improving storage stability of the resulting ink, the weight ratio of the organic solvent to water (organic solvent/water) is preferably not less than 0.05, more preferably not less than 0.08, even more preferably not less than 0.10 and further even more preferably not less than 0.12, and is also preferably not more than 0.40, more preferably not more than 0.35, even more preferably not more than 0.30 and further even more preferably not more than 0.25.

As the mixing dispersers used in the dispersion treatment for obtaining the dispersion 1, there may be used various conventionally known dispersers. Examples of the dispersers include high-speed stirring mixers such as dispers and homomixers, kneading machines such as roll mills, kneaders and extruders, high-pressure dispersers such as high-pressure homogenizers, media-type dispersers such as paint shakers and beads mills, and mixing and stirring devices such as anchor blades. These dispersers may also be used in combination of any two or more thereof.

Of these dispersers, from the viewpoint of uniformly dispersing the pigment in water, high-speed stirring mixers such as dispers and homomixers and media-type dispersers such as paint shakers and beads mills are preferably used. Examples of the commercially available high-speed stirring mixers include "Ultra Disper" available from Asada Iron Works Co., Ltd., and "ROBOMICS" available from PRIMIX Corporation. Examples of the commercially available media-type dispersers include "Ultra Apex Mill" available from Kotobuki Industries Co., Ltd., and "Pico Mill" available from Asada Iron Works Co., Ltd.

When using the media-type dispersers, the material of dispersing media thereof used in the dispersing step is preferably a ceramic material such as zirconia and titania, a polymer material such as polyethylene and nylon, a metal, etc. Of these materials, from the viewpoint of good abrasion resistance, zirconia is more preferred. In addition, from the viewpoint of sufficiently atomizing the pigment, the diameter of the media is preferably not less than 0.003 mm and more preferably not less than 0.01 mm, and is also preferably not more than 0.5 mm and more preferably not more than 0.4 mm.

The dispersing time is preferably not less than 0.3 hour and more preferably not less than 1 hour from the viewpoint of sufficiently atomizing the pigment, and is also preferably not more than 200 hours and more preferably not more than 50 hours from the viewpoint of enhancing production efficiency of the pigment dispersion.

From the viewpoint of atomizing and dispersing the pigment particles, the dispersion treatment in the step 1 preferably includes a high-pressure dispersion treatment. More specifically, it is preferred that after subjecting the mixed solution containing the pigment, the polymerizable surfactant, water and the organic solvent to dispersion treatment, the resulting dispersion is further subjected to high-pressure dispersion treatment to obtain the dispersion 1, and it is more preferred that after subjecting the mixed solution to dispersion treatment using a high-speed stirring mixer or a media-type disperser, the resulting dispersion is further subjected to high-pressure dispersion treatment to obtain the dispersion 1.

The term "high-pressure dispersion" as used herein means that the dispersion treatment is conducted under a pressure of not less than 20 MPa. The dispersing pressure is preferably not less than 50 MPa, more preferably not less than 100 MPa and even more preferably not less than 130 MPa from the viewpoint of wetting the surface of the pigment with the polymerizable surfactant to uniformly disperse the pigment in the resulting dispersion. Also, from the viewpoint of good operating properties in the dispersion treatment, the dispersing pressure is preferably not more than 250 MPa and more preferably not more than 200 MPa.

The number of passes through the disperser upon the high-pressure dispersion treatment is preferably not less than 2, more preferably not less than 3, even more preferably not less than 5, further even more preferably not less than 7 and still further even more preferably not less than 9 from the viewpoint of wetting the surface of the pigment with the polymerizable surfactant to uniformly disperse the pigment in the resulting dispersion. Also, from the viewpoint of good dispersion treatment efficiency, the number of passes through the disperser upon the high-pressure dispersion treatment is not more than 20. The operation method of the disperser upon the high-pressure dispersion treatment may be either a circulating method or a continuous method. Among these operation methods, from the viewpoint of suppressing occurrence of distribution of the dispersion condition owing to the number of passes through the disperser, preferred is a continuous method.

As the high-pressure dispersers used in the present invention, there may be mentioned homo-valve-type high-pressure homogenizers such as typically "High-Pressure Homogenizer" (tradename) available from Izumi Food Machinery Co., Ltd., and chamber-type high-pressure homogenizers such as "MICROFLUIDIZER" (tradename) available from Microfluidics Corp., "Nanomizer" (tradename) available from Yoshida Kikai Kogyo Co., Ltd., and "Ultimizer" and "Starburst" (tradenames) both available from Sugino Machine Ltd. Of these dispersers, preferred are chamber-type high-pressure homogenizers such as "MICROFLUIDIZER" (tradename), "Nanomizer" (tradename), and "Ultimizer" and "Starburst" (tradenames).

The temperature of the dispersion upon the high-pressure dispersion treatment is not particularly limited, and is preferably from 5 to 80° C.

(Step 2: Organic Solvent Removal Step)

The production process of the present invention includes the step of removing the organic solvent from the dispersion 1 to prepare a dispersion 2. When removing the organic solvent from the dispersion in the step 2 after dispersing the pigment in the step 1, the resin produced by the emulsion polymerization in the step 3 can be prevented from being coalesced together, and it is therefore possible to obtain a colored fine particle dispersion containing the dispersed particles having a small particle size.

Examples of an apparatus used for removing the organic solvent include at least one apparatus selected from the group consisting of a thin film distillation apparatus such as a batch simple distillation device, a reduced pressure distillation device and a flush evaporator, a rotary distillation device and a stirring evaporator. Among these apparatuses, from the viewpoint of efficiently removing the organic solvent from the dispersion, preferred is at least one apparatus selected from the group consisting of a rotary distillation device and a stirring evaporator. In the case where the organic solvent is removed at one time from the dispersion treatment product that is obtained in an amount as small as not more than 5 kg, the rotary distillation device is preferably used, whereas in the case where the organic solvent is removed at one time from the dispersion treatment product that is obtained in an amount as large as more than 5 kg, the stirring evaporator is preferably used. Among the rotary distillation devices, more preferred is a rotary reduced-pressure distillation device such as a rotary evaporator, and among the stirring evaporators, more preferred is a stirring tank thin film evaporator.

The temperature of the dispersion treatment product upon removing the organic solvent therefrom may be appropriately selected according to the kind of organic solvent to be removed. The temperature of the dispersion treatment product upon removing the organic solvent therefrom under reduced pressure is preferably not lower than 20° C., more preferably not lower than 25° C. and even more preferably not lower than 30° C., and is also preferably not higher than 80° C., more preferably not higher than 70° C. and even more preferably not higher than 65° C.

The pressure used upon removal of the organic solvent is preferably not less than 0.01 MPa, more preferably not less than 0.02 MPa and even more preferably not less than 0.05 MPa, and is also preferably not more than 0.5 MPa, more preferably not more than 0.2 MPa and even more preferably not more than 0.1 MPa, from the viewpoint of efficiently removing the organic solvent from the dispersion.

The time required for removal of the organic solvent is preferably not less than 1 hour, more preferably not less than 2 hours and even more preferably not less than 5 hours, and is also preferably not more than 24 hours, more preferably not more than 12 hours and even more preferably not more than 10 hours.

The removal of the organic solvent is conducted until the solid content of the dispersion 1 reaches preferably not less than 18% by mass, more preferably not less than 20% by mass and even more preferably not less than 22% by mass, and also preferably not more than 60% by mass, more preferably not more than 40% by mass and even more preferably not more than 30% by mass.

(Dispersion 2)

The content of the pigment in the dispersion 2 is preferably not less than 5% by mass, more preferably not less than 10% by mass and even more preferably not less than 15% by mass from the viewpoint of attaining good coloring properties of the resulting ink, and is also preferably not more than 40% by mass, more preferably not more than 35% by mass and even more preferably not more than 30% by mass from the viewpoint of maintaining good dispersion stability of the pigment in the dispersion.

The content of the polymerizable surfactant in the dispersion 2 is preferably not less than 0.1% by mass, more preferably not less than 0.5% by mass and even more preferably not less than 1.0% by mass from the viewpoint of maintaining good dispersion stability of the pigment in the dispersion, and is also preferably not more than 30% by mass, more preferably not more than 20% by mass, even more preferably not more than 10% by mass and further even more preferably not more than 5.0% by mass form the viewpoint of uniformly coating the pigment with the polymer in the emulsion polymerization step.

The solid content of the dispersion 2 is preferably not less than 18% by mass, more preferably not less than 20% by mass and even more preferably not less than 22% by mass, and is also preferably not more than 60% by mass, more preferably not more than 40% by mass and even more preferably not more than 30% by mass.

(Step 3: Emulsion Polymerization Step)

The production process of the present invention includes the step of subjecting the dispersion 2 and the polymerizable monomer to emulsion polymerization to obtain the colored fine particle dispersion. In order to prevent occurrence of polymerization of the polymerizable surfactant during the organic solvent removal operation in the step 2, it is preferred that the polymerizable initiator is added not in or before the step 2 but during the step 3.

(Emulsion Polymerization)

The emulsion polymerization as used in the present invention means the method in which the polymerizable monomer including a hydrophobic vinyl-based monomer is emulsified or dispersed in the dispersing medium containing water as a main component in the presence of a surfactant, and polymerized using a polymerization initiator.

In the emulsion polymerization in the present invention, it is preferred that a surfactant is further added in addition to the aforementioned polymerizable surfactant used in the step 1. The additional surfactant may include a polymerizable surfactant and the other surfactant. As the other surfactant, there may be used surfactants for emulsion polymerization. The other surfactant is preferably in the form of the same anionic or nonionic surfactant as the aforementioned polymerizable surfactant from the viewpoint of stable emulsification of the polymerizable monomer.

Examples of the anionic surfactant include fatty acid salts, alkylbenzenesulfonic acid salts, polyoxyethylene alkylphenylethersulfuric acid ester salts, polyoxyethylene aralkylarylethersulfuric acid ester salts and polyoxyethylene alkylethersulfuric acid ester salts. Of these anionic surfactants, preferred are polyoxyethylene alkylethersulfuric acid ester salts. Examples of the nonionic surfactant include polyoxyethylene nonyl phenyl ether, polyoxyethylene aralkyl aryl ethers and polyoxyethylene alkyl ethers.

The surfactant acts for emulsifying the polymerizable monomer and stably supplying the polymerizable monomer to the dispersion 2. The surfactant for emulsifying the polymerizable monomer upon the emulsion polymerization is preferably a polymerizable surfactant and more preferably the same polymerizable surfactant as used in the step 1. Since the polymerizable surfactant contains at least one radical-polymerizable unsaturated double bond in a molecule thereof, the polymerizable surfactant is copolymerized with the polymerizable monomer and incorporated into the resulting polymer, so that it is possible to produce the colored fine particle dispersion having excellent dispersion stability.

The emulsion polymerization in the present invention is not particularly limited as long as it is the method of conducting emulsion polymerization in the presence of the pigment, the polymerizable surfactant and the polymerizable monomer including the hydrophobic vinyl-based monomer. However, the emulsion polymerization is preferably conducted by the following step 3'.

(Step 3')

Step 3': mixing the dispersion 2 with the polymerizable monomer including the hydrophobic vinyl-based monomer to subject the resulting mixture to emulsion polymerization.

In the dispersion 2 used in the step 3', the pigment particles are dispersed in the solvent containing water as a main component, and the polymerizable surfactant containing a hydrophilic group, a hydrophobic group and a polymerizable group is allowed to coexist with the pigment particles. When mixing the dispersion 2 with the polymerizable monomer including the hydrophobic vinyl-based monomer to copolymerize the polymerizable group of the polymerizable surfactant with the polymerizable group of the polymerizable monomer, for example, by adding a polymerization initiator to the obtained mixture, etc., it is possible to produce the colored fine particle dispersion containing the pigment coated with the polymer.

In the emulsion polymerization in the present invention, as the surfactant, the aforementioned polymerizable surfactant may be used in combination with the other surfactant. However, in such a case, the proportion of the polymerizable surfactant used in the emulsion polymerization is preferably not less than 5% by mass and more preferably not less than 20% by mass, and is also not more than 100% by mass, on the basis of a whole amount of the surfactants used therein (polymerizable surfactant+the other surfactant).

The amount of the surfactants used is preferably not less than 3 parts by mass, more preferably not less than 4 parts by mass and even more preferably not less than 5 parts by mass, and is also preferably not more than 20 parts by mass, more preferably not more than 15 parts by mass and even more preferably not more than 12 parts by mass, on the basis of 100 parts by mass of the polymerizable monomer used in the emulsion polymerization in the step 3, from the viewpoint of improving gloss and rub fastness of the printed characters or images.

(Polymerizable Monomer)

The polymerizable monomer used in the present invention includes the hydrophobic vinyl-based monomer. Meanwhile, the term referred to merely as a "polymerizable monomer" as used in the present invention is intended to mean the monomer excluding the polymerizable surfactant. However, actually, in the below-mentioned emulsion polymerization, the polymerizable surfactant may be incorporated into the polymer by copolymerizing with the polymerizable monomer.

The term "hydrophobic" of the hydrophobic vinyl-based monomer as used in the present invention means that the amount of the monomer that can be dissolved in 100 g of ion-exchanged water as measured at 25° C. is less than 10 g.

As the hydrophobic vinyl-based monomer, there may be mentioned those monomers containing at least a hydrophobic group and a polymerizable group in their structure. Examples of the hydrophobic group include at least one group selected from the group consisting of an aliphatic hydrocarbon group, an alicyclic hydrocarbon group and an aromatic hydrocarbon group. Examples of the polymerizable group include at least one group selected from the group consisting of a vinyl group, an allyl group, an acryloyl group, a methacryloyl group, a propenyl group, a vinylidene group and a vinylene group.

Examples of the hydrophobic vinyl-based monomer include at least one compound selected from the group consisting of a (meth)acrylic acid ester and an aromatic ring-containing hydrophobic monomer.

The term "(meth)acrylic acid ester" as used herein means at least one compound selected from the group consisting of an acrylic acid ester and a methacrylic acid ester, and the term "(meth)" as described hereinafter has the same meaning as defined above.

Specific examples of the (meth)acrylic acid ester include acrylic acid esters containing an alkyl group having not less than 1 and not more than 10 carbon atoms and preferably not less than 1 and not more than 8 carbon atoms, such as methyl acrylate, ethyl acrylate, propyl acrylate and 2-ethylhexyl acrylate; and methacrylic acid esters containing an alkyl group having not less than 1 and not more than 10 carbon atoms and preferably not less than 1 and not more than 8 carbon atoms, such as methyl methacrylate, ethyl methacrylate, propyl methacrylate and 2-ethylhexyl methacrylate.

Of these (meth)acrylic acid esters, preferred is at least one compound selected from the group consisting of methyl acrylate, ethyl acrylate, methyl methacrylate, ethyl methacrylate, 2-ethylhexyl acrylate and 2-ethylhexyl methacrylate.

As the aromatic ring-containing hydrophobic monomer, there may be mentioned a styrene-based monomer, an aromatic group-containing (meth)acrylate, etc.

Examples of the styrene-based monomer include styrene, 2-methyl styrene, etc. Examples of the aromatic group-containing (meth)acrylate include benzyl (meth)acrylate, phenoxyethyl (meth)acrylate, etc. Of these compounds, preferred is at least one compound selected from the group consisting of styrene and benzyl (meth)acrylate, and more preferred is styrene.

The content of the hydrophobic monomer in the polymerizable monomer is preferably not less than 70% by mass, more preferably not less than 80% by mass, even more preferably not less than 90% by mass and further even more preferably not less than 93% by mass, and is also preferably not more than 100% by mass, more preferably not more than 99% by mass and even more preferably not more than 98% by mass, from the viewpoint of improving dispersion stability of the colored fine particle dispersion as well as gloss of the printed characters or images.

The polymerizable monomer preferably includes an ionic monomer. Examples of the ionic monomer include anionic monomers such as carboxylic acid monomers, sulfonic acid monomers and phosphoric acid monomers, and cationic monomers.

Specific examples of the carboxylic acid monomers include (meth)acrylic acid, crotonic acid, itaconic acid, maleic acid, fumaric acid, citraconic acid and 2-methacryloyloxymethylsuccinic acid. Specific examples of the sulfonic acid monomers include styrenesulfonic acid, 2-acrylamido-2-methylpropanesulfonic acid and 3-sulfopropyl (meth)acrylate. Specific examples of the phosphoric acid monomers include vinylphosphonic acid, vinyl phosphate, bis(methacryloxyethyl)phosphate, diphenyl-2-acryloyloxyethyl phosphate and diphenyl-2-methacryloyloxyethyl phosphate.

Among these ionic monomers, preferred are the carboxylic acid monomers, more preferred is (meth)acrylic acid, and even more preferred is methacrylic acid.

The content of the ionic monomer in the polymerizable monomer is preferably not less than 0% by mass, more preferably not less than 0.1% by mass, even more preferably not less than 1% by mass and further even more preferably not less than 2% by mass, and is also preferably not more than 20% by mass, more preferably not more than 15% by mass, even more preferably not more than 10% by mass and further even more preferably not more than 7% by mass, form the viewpoint of improving dispersion stability of the colored fine particle dispersion as well as gloss of the printed characters or images.

The polymerizable monomer may further contain the other monomer, if required. Examples of the other monomer include polyethylene glycol mono(meth)acrylate, methoxy polyethylene glycol mono(meth)acrylate, octoxy polyethylene glycol mono(meth)acrylate and stearoyloxy polyethylene glycol mono(meth)acrylate.

Specific examples of the commercially available products of these monomers include "NK ESTER M-90G", "NK ESTER M-230G", "NK ESTER M-450G" and "NK ESTER M-900G" all available from Shin-Nakamura Chemical Co., Ltd., and "LIGHT ESTER 041MA" available from Kyoeisha Chemical Co., Ltd.

(Polymerization Initiator)

As the polymerization initiator, there may be used any of polymerization initiators that may be suitably used for ordinary emulsion polymerization processes. However, the polymerization initiator is preferably in the form of a water-soluble polymerization initiator. Specific examples of the polymerization initiator include persulfates such as potassium persulfate and ammonium persulfate; hydrogen peroxide; organic peroxides such as t-butyl hydroperoxide, benzoyl peroxide and cumene hydroperoxide; and azo-based initiators such as azobisdiisobutyronitrile and 2,2-azobis(2-amidinopropane) dihydrochloride. Of these polymerization initiators, preferred are persulfates. In addition, as the polymerization initiator, there may also be used redox-based initiators formed of a combination of the peroxide with a reducing agent such as sodium sulfite, rongalite and ascorbic acid.

In the emulsion polymerization, a chain transfer agent may also be used. Examples of the chain transfer agent include mercaptans such as n-dodecyl mercaptan, t-dodecyl mercaptan and n-octyl mercaptan; xanthogens such as dimethyl xanthogen disulfide and diisobutyl xanthogen disulfide; and dipentene, indene, 1,4-cyclohexadiene, dihydrofuran and xanthene.

The dispersing medium used in the emulsion polymerization may contain, in addition to water, an optional organic solvent.

Examples of the organic solvent that may be used in the dispersing medium include alcohols having not less than 1 and not more than 6 carbon atoms, ketones, ethers, amides, aromatic hydrocarbons and aliphatic hydrocarbons having not less than 5 and not more than 10 carbon atoms.

The proportion between water and the organic solvent in the dispersing medium is not particularly limited. The proportion of water to a whole amount of the dispersing medium is preferably not less than 50% by mass, more preferably not less than 65% by mass, even more preferably not less than 75% by mass and further even more preferably not less than 80% by mass.

The conditions of the emulsion polymerization in the present invention are not particularly limited. The amount of the polymerizable monomer used in the emulsion polymerization is preferably not less than 1% by mass, more preferably not less than 10% by mass and even more preferably not less than 15% by mass, on the basis of the whole reaction system used in the emulsion polymerization reaction, from the viewpoint of improving gloss of the printed characters or images, and is also preferably not more than 60% by mass, more preferably not more than 40% by mass and even more preferably not more than 25% by mass, on the basis of the whole reaction system used in the emulsion polymerization reaction, from the viewpoint of suppressing increase in viscosity of the resulting ink when concentrated.

The mass ratio of the polymerizable monomer to the pigment (polymerizable monomer/pigment) upon the emulsion polymerization is preferably from 90/10 to 10/90, more preferably from 80/20 to 20/80 and even more preferably from 75/25 to 40/60, from the viewpoint of suppressing increase in viscosity of the resulting ink when concentrated and suppressing increase in viscosity of the resulting ink when concentrated.

The polymerizable monomer may be added by known methods such as a monomer dropwise addition method, a monomer batch charging method and a pre-emulsion method. Of these methods, from the viewpoint of attaining good polymerization stability, the pre-emulsion method is preferably used. The pre-emulsion method is the method in which a pre-emulsion prepared by previously mixing and emulsifying the polymerizable monomer, the surfactant and water is added dropwise to the dispersion.

More specifically, there may be mentioned the method including the step of conducting the emulsion polymerization while introducing an emulsion containing the polymerizable monomer, the surfactant and water into a solution containing the dispersion 2. As the surfactant, there may be used the polymerizable monomer and the other surfactants.

That is, from the viewpoint of attaining good polymerization stability, the step 3 is preferably the step of adding the pre-emulsion containing the polymerizable monomer, the surfactant and water to a solution containing the dispersion 2 to conduct the emulsion polymerization thereof.

From the viewpoint of suppressing formation of coarse particles, the pre-emulsion is prepared using a rotary stirring device. The rotating speed of the rotary stirring device is preferably not less than 200 rpm and more preferably not less than 300 rpm, and is also preferably not more than 5000 rpm, more preferably not more than 2000 rpm and even more preferably not more than 1000 rpm. The stirring time is preferably not less than 10 minutes and more preferably not less than 30 minutes.

In the pre-emulsion method, the time of the dropwise addition of the pre-emulsion is preferably not less than 0.5 hour and more preferably not less than 1 hour, from the viewpoint of obtaining emulsified particles having a uniform particle size in the resulting emulsion, and is also preferably not more than 8 hours and more preferably not more than 6 hours, from the viewpoint of improving reactivity of the emulsion polymerization. The aging time is preferably not less than 0.5 hour and more preferably not less than 1 hour, and is also preferably not more than 5 hours and more preferably not more than 3 hours.

The polymerization temperature used upon the emulsion polymerization may be appropriately controlled according to a decomposition temperature of the polymerization initiator, and is preferably not lower than 50° C., more preferably not lower than 60° C. and even more preferably not lower than 70° C. from the viewpoint of improving reactivity of the emulsion polymerization, and is also preferably not higher than 90° C. and more preferably not higher than 85° C. from the viewpoint of improving the molecular weight distribution of the resulting polymer.

The polymerization temperature when using a persulfate as the water-soluble polymerization initiator is preferably not lower than 70° C. and more preferably not lower than 75° C. from the viewpoint of improving reactivity of the emulsion polymerization, and is also preferably not higher than 85° C. and more preferably not higher than 83° C. from the viewpoint of improving the molecular weight distribution of the resulting polymer.

The polymerization atmosphere is preferably a nitrogen atmosphere or an atmosphere of an inert gas such as argon from the viewpoint of improving reactivity of the emulsion polymerization.

The amount of the compound (A) represented by the formula (I) used upon the emulsion polymerization is preferably not less than 0.5 part by mass, more preferably not less than 1.0 part by mass, even more preferably not less than 3.0 parts by mass and further even more preferably not less than 5.0 parts by mass, and is also preferably not more than 40 parts by mass, more preferably not more than 30 parts by mass, even more preferably not more than 20 parts by mass and further even more preferably not more than 15 parts by mass, on the basis of 100 parts by mass of the polymerizable monomer, from the viewpoint of stably conducting the emulsion polymerization and reducing a residual amount of the compound (A) in the emulsion polymerization. Meanwhile, the amount of the compound (A) used upon the emulsion polymerization means a whole amount of the compound (A) on the basis of 100 parts by mass of the polymerizable monomer contained upon the emulsion polymerization.

The amount of the water-soluble polymerization initiator used is preferably not less than 0.01 part by mass, more preferably not less than 0.05 part by mass and even more preferably not less than 0.1 part by mass, and is also preferably not more than 5 parts by mass, more preferably not more than 3 parts by mass and even more preferably not more than 1 part by mass, on the basis of 100 parts by mass of the polymerizable monomer, from the viewpoint of improving the molecular weight distribution of the resulting polymer.

[Colored Fine Particle Dispersion]

The colored fine particle dispersion according to the present invention is in the form of a dispersion prepared by dispersing the colored fine particles constituted of the pigment, the polymerizable surfactant and the polymer containing the constitutional unit derived from the polymerizable monomer including the hydrophobic vinyl-based monomer in a dispersing medium containing water as a main medium. The colored fine particle dispersion according to the present invention can be used as a coloring material for a water-based ink for ink-jet printing which includes the colored fine particle dispersion. In this case, the configuration of the colored fine particles in the colored fine particle dispersion is preferably composite particles formed by coating at least the pigment with the polymer. Examples of the configuration of the colored fine particles in the colored fine particle dispersion include the particle configuration in which the pigment is enclosed within the respective polymer particles, the particle configuration in which the pigment is uniformly dispersed in the respective polymer particles, the particle configuration in which the pigment is exposed onto a surface of the respective polymer particles, and the like.

The content (solid content) of the colored fine particles in the colored fine particle dispersion is preferably not less than 10% by mass, more preferably not less than 15% by mass, even more preferably not less than 20% by mass and further even more preferably not less than 25% by mass, and is also preferably not more than 60% by mass, more preferably not more than 55% by mass, even more preferably not more than 50% by mass and further even more preferably not more than 40% by mass, form the viewpoint of stably emulsifying and dispersing the colored fine particles.

The content of the pigment in the colored fine particle dispersion is preferably not less than 1.0% by mass, more preferably not less than 3.0% by mass and even more preferably not less than 5.0% by mass, and is also preferably not more than 40% by mass, more preferably not more than 30% by mass, even more preferably not more than 20% by mass and further even more preferably not more than 15% by mass, form the viewpoint of improving optical density of the resulting ink.

The content of the polymer in the colored fine particle dispersion is preferably not less than 1.0% by mass, more preferably not less than 5.0% by mass and even more preferably not less than 15% by mass, and is also preferably not more than 50% by mass, more preferably not more than 40% by mass and even more preferably not more than 30% by mass, form the viewpoint of improving rub fastness of the printed characters or images.

The mass ratio of the pigment to the polymer [pigment/polymer] in the colored fine particle dispersion is preferably not less than 0.1, more preferably not less than 0.2 and even more preferably not less than 0.4, and is also preferably not more than 4.0, more preferably not more than 2.0 and even more preferably not more than 1.0, form the viewpoint of suppressing increase in viscosity of the resulting water-based ink when concentrated, enhancing optical density of the water-based ink when printed on a low-water absorbing recording medium and improving gloss of the printed characters or images.

The average particle size of the particles in the colored fine particle dispersion is preferably not less than 10 nm, more preferably not less than 30 nm, even more preferably not less than 40 nm, further even more preferably not less than 50 nm, still further even more preferably not less than 60 nm, still further even more preferably not less than 75 nm and still further even more preferably not less than 80 nm, and is also preferably not more than 300 nm, more preferably not more than 200 nm, even more preferably not more than 160 nm, further even more preferably not more than 150 nm, still further even more preferably not more than 140 nm and still further even more preferably not more than 130 nm, from the viewpoint of suppressing increase in viscosity of the resulting ink when concentrated and improving rub fastness of the printed characters or images when printed on a low-water absorbing recording medium.

Meanwhile, the average particle size of the colored fine particles may be measured by the method described in Examples below.

(Neutralizing Agent)

In the present invention, from the viewpoint of improving dispersion stability of the colored fine particles as well as storage stability of the resulting water-based ink, a neutralizing agent may be used, if required. When using the neutralizing agent, the pH value of the colored fine particle dispersion is preferably controlled to not less than 7 and more preferably not less than 7.5, and is also preferably controlled to not more than 11 and more preferably not more than 9.5.

Examples of the neutralizing agent include hydroxides of alkali metals, ammonia and organic amines.

Specific examples of the hydroxides of alkali metals include lithium hydroxide, sodium hydroxide, potassium hydroxide and cesium hydroxide. Among these hydroxides of alkali metals, preferred is sodium hydroxide.

Specific examples of the organic amines include trimethylamine, ethylamine, diethylamine, triethylamine and triethanolamine.

These neutralizing agents may be used alone or in the form of a mixture of any two or more thereof.

[Process for Producing Water-Based Ink for Ink-Jet Printing]

The process for producing a water-based ink for ink-jet printing according to the present invention includes the step of mixing the colored fine particle dispersion according to the present invention and an organic solvent B, from the viewpoint of obtaining printed characters or images that are excellent in rub fastness when printed on a low-water absorbing recording medium and have high gloss.

In the water-based ink obtained by the production process of the present invention, the colored fine particle dispersion according to the present invention is used as a colorant.

Examples of the compound used as the organic solvent B include at least one compound selected from the group consisting of polyhydric alcohols, polyhydric alcohol alkyl ethers, nitrogen-containing heterocyclic compounds, amides, amines and sulfur-containing compounds. Among these compounds, from the viewpoint of improving gloss of the printed characters or images, preferred is at least one compound selected from the group consisting of polyhydric alcohols and polyhydric alcohol alkyl ethers, and more preferred are polyhydric alcohols. The polyhydric alcohols may be used in the form of a mixture containing a plurality of compounds belonging to the concept of polyhydric alcohols, and the polyhydric alcohol alkyl ethers may also be used in the form of a mixture containing a plurality of compounds belonging to the concept of polyhydric alcohol alkyl ethers.

The content of the at least one compound selected from the group consisting of polyhydric alcohols and polyhydric alcohol alkyl ethers in the organic solvent B is preferably not less than 80% by mass, more preferably not less than 90% by mass, even more preferably not less than 95% by mass, further even more preferably substantially 100% by mass and still further even more preferably 100% by mass.

Examples of the polyhydric alcohols include ethylene glycol, diethylene glycol, triethylene glycol, polyethylene glycol, propylene glycol, dipropylene glycol and tripropylene glycol. Among these polyhydric alcohols, from the viewpoint of improving gloss and rub fastness of the printed characters or images when printed on a low-water absorbing recording medium, preferred is propylene glycol.

Examples of the polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, diethylene glycol monoisobutyl ether, triethylene glycol monomethyl ether, triethylene glycol monobutyl ether, triethylene glycol monoisobutyl ether, tetraethylene glycol monomethyl ether, propylene glycol monoethyl ether, dipropylene glycol monobutyl ether, dipropylene glycol monomethyl ether, tripropylene glycol monomethyl ether and tripropylene glycol monobutyl ether. Among these polyhydric alcohol alky ethers, from the viewpoint of improving gloss and rub fastness of the printed characters or images when printed on a low-water absorbing recording medium, preferred is diethylene glycol monoisobutyl ether.

The water-based ink may also be produced by further adding, in addition to the aforementioned organic solvent B, various ordinary additives such as a wetting agent, a penetrant, a dispersant, a surfactant, a viscosity controller, a defoaming agent, an antiseptic agent, a mildew-proof agent and a rust preventive to the colored fine particle dispersion.

The content of the pigment in the water-based ink is preferably not less than 1% by mass, more preferably not less than 1.5% by mass and even more preferably not less than 2.0% by mass, and is also preferably not more than 15% by mass, more preferably not more than 10% by mass and even more preferably not more than 6.0% by mass, from the viewpoint of improving gloss of the printed characters or images.

The content of the polymer in the water-based ink is preferably not less than 0.5% by mass, more preferably not less than 0.8% by mass, even more preferably not less than 1.0% by mass and further even more preferably not less than 2% by mass, and is also preferably not more than 30% by mass, more preferably not more than 20% by mass and even more preferably not more than 12% by mass, from the viewpoint of improving gloss of the printed characters or images and improving rub fastness of the printed characters or images when printed on a low-water absorbing recording medium.

The content of water in the water-based ink for ink-jet printing is preferably not less than 20% by mass, more preferably not less than 30% by mass and even more preferably not less than 40% by mass, from the viewpoint of improving rub fastness of the printed characters or images when printed on a low-water absorbing recording medium, and is also preferably not more than 70% by mass, more preferably not more than 65% by mass and even more preferably not more than 60% by mass, from the viewpoint of improving ejection properties of the water-based ink.

The mass ratio of the pigment to the polymer [pigment/polymer] in the water-based ink is preferably not less than 0.1, more preferably not less than 0.2 and even more preferably not less than 0.4, and is also preferably not more than 4.0, more preferably not more than 2.0 and even more preferably not more than 1.0, from the viewpoint of improving gloss of the printed characters or images.

(Properties of Water-Based Ink)

The average particle size of the colored fine particles in the water-based ink is preferably not less than 10 nm, more preferably not less than 30 nm, even more preferably not less than 40 nm, further even more preferably not less than 50 nm, still further even more preferably not less than 60 nm, still further even more preferably not less than 75 nm and still further even more preferably not less than 80 nm, and is also preferably not more than 300 nm, more preferably not more than 200 nm, even more preferably not more than 160 nm, further even more preferably not more than 150 nm, still further even more preferably not more than 140 nm and still further even more preferably not more than 130 nm, from the viewpoint of improving rub fastness of the printed characters or images when printed on a low-water absorbing recording medium.

Meanwhile, the average particle size of the particles in the water-based ink may be measured by the method described in Examples below.

The viscosity of the water-based ink as measured at 25° C. is preferably not less than 2.0 mPa·s, more preferably not less than 3.0 mPa·s and even more preferably not less than 4.0 mPa·s, and is also preferably not more than 12 mPa·s, more preferably not more than 9.0 mPa·s and even more preferably not more than 7.0 mPa·s, from the viewpoint of improving storage stability and ejection properties of the water-based ink.

Meanwhile, the viscosity at 25° C. of the water-based ink may be measured by the method described in Examples below.

The static surface tension of the water-based ink as measured at 20° C. is preferably not less than 20 mN/m and more preferably not less than 25 mN/m, and is also preferably not more than 50 mN/m, more preferably not more than mN/m, even more preferably not more than 40 mN/m and further even more preferably not more than 35 mN/m, from the viewpoint of improving ejection properties of the water-based ink. Meanwhile, the static surface tension at 20° C. of the water-based ink may be measured by the method described in Examples below.

The pH value of the water-based ink is preferably not less than 7.0, more preferably not less than 7.5 and even more preferably not less than 8.0 from the viewpoint of improving storage stability of the water-based ink and improving rub fastness of the printed characters or images when printed on a low-water absorbing recording medium, and is also preferably not more than 11.0, more preferably not more than 10.0 and even more preferably not more than 9.5 from the viewpoint of improving resistance of members to the water-based ink and suppressing skin irritation. Meanwhile, the pH value of the water-based ink may be measured by the method described in Examples below.

(Ink-Jet Printing Method)

The water-based ink according to the present invention may be used in an ink-jet printing method in which characters or images are printed on a recording medium such as a plain paper or an ink-jet paper. In addition, the water-based ink is preferably used in an ink-jet printing method in which characters or images are printed on a low-water absorbing recording medium, because of excellent rub fastness of the water-based ink.

As the method of ejecting the water-based ink in an inkjet printer, there may be mentioned ink-ejecting methods using thermal-type or piezoelectric-type ink-jet print heads. In the present invention, the ink is preferably ejected and printed by the method using a piezoelectric-type ink-jet print head.

The water absorption of the low-water absorbing recording medium used in the present invention as measured by contacting with pure water for 100 ms is preferably not less than 0 g/m$^2$, more preferably not less than 1.0 g/m$^2$ and even more preferably not less than 2.0 g/m$^2$ from the viewpoint of promoting drying of the printed characters or images and enhancing rub fastness of the printed characters or images, and is also preferably not more than 10 g/m$^2$, more preferably not more than 8.0 g/m$^2$, even more preferably not more than 6.0 g/m$^2$ and further even more preferably not more than 4.0 g/m$^2$ from the viewpoint of enhancing optical density and gloss of the printed characters or images. The water absorption may be measured as follows. That is, using an automatic scanning absorptometer "KM500win" available from Kumagai Riki Kogyo Co., Ltd., an amount of pure water transferred to a recording medium when contacted with pure water for 100 ms was measured at 23° C. under a relative humidity of 50%. The thus measured amount of pure water transferred to the recording medium was determined as the water absorption of the recording medium.

As the low-water absorbing recording medium for ink-jet printing, from the viewpoint of improving rub fastness of the printed characters or images, there are preferably used a coated paper and a synthetic resin film and more preferably a synthetic resin film.

Examples of the coated paper include "OK Topcoat+" (available from Oji Paper Co., Ltd.; basis weight: 104.7 g/m$^2$; 60° gloss: 49.0; water absorption as measured by contacting with pure water for 100 ms (hereinafter defined in the same way): 4.9 g/m$^2$), a multi-color foam gloss coated paper (available from Oji Paper Co., Ltd.; 104.7 g/m$^2$; 60° gloss: 36.8; water absorption: 5.2 g/m$^2$), "UPM Finesse Gloss" (available from UPM; 115 g/m$^2$; 60° gloss: 27.0; water absorption: 3.1 g/m$^2$), "UPM Finesse Matt" (available from UPM; 115 g/m$^2$; 60° gloss: 5.6; water absorption: 4.4 g/m$^2$), "TerraPress Silk" (available from Stora Enso; 80 g/m$^2$; 60° gloss: 6.0; water absorption: 4.1 g/m$^2$), and "LumiArt" (available from Stora Enso; 90 g/m$^2$; 60° gloss: 26.3).

Examples of the synthetic resin film include a polyester film, a vinyl chloride film, a polypropylene film, a polyethylene film and a nylon film. These films may be subjected to surface treatments such as corona treatment, etc., if required.

Examples of the generally available synthetic resin films include "LUMIRROR T60" (available from Toray Industries Inc.; polyethylene terephthalate; thickness: 125 μm; 60° gloss: 189.1; water absorption: 2.3 g/m$^2$), "PVC80B P" (available from Lintec Corp.; polyvinyl chloride; 60° gloss: 58.8; water absorption: 1.4 g/m$^2$), "KINATH KEE 70CA" (available from Lintec Corp.; polyethylene), "YUPO SG90 PAT1" (available from Lintec Corp.; polypropylene), "BONYL RX" (available from Kohjin Film & Chemical Co., Ltd.; nylon) and "TETRON U2" (available from Teijin DuPont Films Japan Ltd.; white polyester film).

With respect to the aforementioned embodiments, the present invention further provides the following aspects relating to the process for producing a colored fine particle dispersion, and the water-based ink including the colored fine particle dispersion produced by the process.

<1> A process for producing a colored fine particle dispersion by subjecting a dispersion including a pigment, a polymerizable monomer, a polymerizable surfactant and water to emulsion polymerization, including the following steps 1 to 3:

Step 1: dispersing a mixed solution including the pigment, the polymerizable surfactant, the water and an organic solvent to prepare a dispersion 1;

Step 2: removing the organic solvent from the dispersion 1 to prepare a dispersion 2; and Step 3: subjecting the dispersion 2 and the polymerizable monomer to emulsion polymerization to obtain the colored fine particle dispersion.

<2> The process for producing a colored fine particle dispersion according to the aspect <1>, wherein a polymerization initiator is added in the step 3 to conduct the emulsion polymerization.

<3> The process for producing a colored fine particle dispersion according to the aspect <1> or <2>, wherein the step 3 includes the step of conducting the emulsion polymerization while introducing an emulsion including the polymerizable monomer, a surfactant and water into a solution including the dispersion 2.

<4> The process for producing a colored fine particle dispersion according to any one of the aspects <1> to <3>, wherein a weight ratio of the organic solvent to the water (organic solvent/water) at the time of termination of the step 1 is not less than 0.05 and not more than 0.40.

<5> The process for producing a colored fine particle dispersion according to any one of the aspects <1> to <4>, wherein the organic solvent is at least one compound selected from the group consisting of alcohols having not less than 1 and not more than 6 carbon atoms, ketones, ethers, amides, aromatic hydrocarbons and aliphatic hydrocarbons having not less than 5 and not more than 10 carbon atoms, preferably oxygen atom-containing polar solvent(s) having not less than 1 and not more than 5 carbon atoms, more preferably at least one compound selected from the group consisting of alcohols having not less than 1 and not more than 5 carbon atoms and ketones having not less than 1 and not more than 5 carbon atoms, and even more preferably ketone(s) having not less than 1 and not more than 5 carbon atoms.

<6> The process for producing a colored fine particle dispersion according to any one of the aspects <1> to <4>, wherein the organic solvent is at least one compound selected from the group consisting of methanol, ethanol, acetone and methyl ethyl ketone, and preferably methyl ethyl ketone.

<7> The process for producing a colored fine particle dispersion according to any one of the aspects <1> to <6>, wherein a content of the polymerizable surfactant in the dispersion in the step 1 is preferably not less than 1% by mass, more preferably not less than 5% by mass and even more preferably not less than 8% by mass, and is also preferably not more than 50% by mass, more preferably not more than 30% by mass, even more preferably not more than 20% by mass and further even more preferably not more than 15% by mass, on the basis of the pigment.

<8> The process for producing a colored fine particle dispersion according to any one of the aspects <1> to <7>, wherein the polymerizable surfactant is capable of being copolymerized with an ethylenically unsaturated monomer, includes an anionic or nonionic surfactant containing at least one radical-polymerizable unsaturated double bond in a molecule thereof, and is at least one surfactant selected from the group consisting of sulfosuccinic acid ester-based surfactants, alkylphenolether-based surfactants and polyoxyethylene-based surfactants.

<9> The process for producing a colored fine particle dispersion according to any one of the aspects <1> to <8>, wherein the polymerizable surfactant is at least one compound selected from the group consisting of compounds represented by the aforementioned general formula (I) and the aforementioned general formula (II).

<10> The process for producing a colored fine particle dispersion according to any one of the aspects <1> to <9>, wherein the pigment is a pigment subjected to no hydrophilic treatment.

<11> The process for producing a colored fine particle dispersion according to any one of the aspects <1> to <10>, wherein a dispersing time of the step 1 is preferably not less than 0.3 hour and more preferably not less than 1 hour, and is also preferably not more than 200 hours and more preferably not more than 50 hours.

<12> The process for producing a colored fine particle dispersion according to any one of the aspects <1> to <11>, wherein the step 1 includes a high-pressure dispersion treatment step.

<13> The process for producing a colored fine particle dispersion according to the aspect <12>, wherein the high-pressure dispersion treatment is conducted under a pressure of not less than 20 MPa, preferably not less than 50 MPa, more preferably not less than 100 MPa and even more preferably not less than 130 MPa, and also preferably not more than 250 MPa and more preferably not more than 200 MPa, and the number of passes through a dispersing apparatus upon the high-pressure dispersion treatment is preferably not less than 2, more preferably not less than 3, even more preferably not less than 5, further even more preferably not less than 7 and still further even more preferably not less than 9, and is also not more than 20.

<14> The process for producing a colored fine particle dispersion according to any one of the aspects <1> to <13>, wherein an apparatus for removing the organic solvent is used in the step 2, and the apparatus for removing the organic solvent is at least one apparatus selected from the group consisting of a batch simple distillation device, a reduced pressure distillation device, a thin film distillation device, a rotary distillation device and a stirring evaporator, and preferably at least one apparatus selected from the group consisting of a rotary distillation device and a stirring evaporator.

<15> The process for producing a colored fine particle dispersion according to any one of the aspects <1> to <14>, wherein a temperature of the dispersion treatment product upon removing the organic solvent therefrom in the step 2 is preferably not lower than 20° C., more preferably not lower than 25° C. and even more preferably not lower than 30° C., and is also preferably not higher than 80° C., more preferably not higher than 70° C. and even more preferably not higher than 65° C., and a pressure used upon removal of the organic solvent in the step 2 is preferably not less than 0.01 MPa, more preferably not less than 0.02 MPa and even more preferably not less than 0.05 MPa, and is also preferably not more than 0.5 MPa, more preferably not more than 0.2 MPa and even more preferably not more than 0.1 MPa.

<16> The process for producing a colored fine particle dispersion according to any one of the aspects <1> to <15>, wherein a time required for removal of the organic solvent in the step 2 is preferably not less than 1 hour, more preferably not less than 2 hours and even more preferably not less than 5 hours, and is also preferably not more than 24 hours, more preferably not more than 12 hours and even more preferably not more than 10 hours.

<17> The process for producing a colored fine particle dispersion according to any one of the aspects <1> to <16>, wherein the removal of the organic solvent in the step 2 is conducted until the solid content of the dispersion 1 reaches preferably not less than 18% by mass, more preferably not less than 20% by mass and even more preferably not less than 22% by mass, and also preferably not more than 60% by mass and more preferably not more than 40% by mass.

<18> The process for producing a colored fine particle dispersion according to any one of the aspects <1> to <17>, wherein a content of the pigment in the dispersion 2 is preferably not less than 5% by mass, more preferably not less than 10% by mass and even more preferably not less than 15% by mass, and is also preferably not more than 40% by mass, more preferably not more than 35% by mass and even more preferably not more than 30% by mass.

<19> The process for producing a colored fine particle dispersion according to any one of the aspects <1> to <18>, wherein a content of the polymerizable surfactant in the dispersion 2 is preferably not less than 0.1% by mass, more preferably not less than 0.5% by mass and even more preferably not less than 1.0% by mass, and is also preferably not more than 30% by mass, more preferably not more than 20% by mass, even more preferably not more than 10% by mass and further even more preferably not more than 5.0% by mass.

<20> The process for producing a colored fine particle dispersion according to any one of the aspects <1> to <19>, wherein a solid content of the dispersion 2 is preferably not less than 18% by mass, more preferably not less than 20% by mass and even more preferably not less than 22% by mass, and is also preferably not more than 60% by mass, more preferably not more than 40% by mass and even more preferably not more than 30% by mass.

<21> The process for producing a colored fine particle dispersion according to any one of the aspects <1> to <20>, wherein a surfactant is further added in the step 3.

<22> The process for producing a colored fine particle dispersion according to the aspect <21>, wherein the surfactant added in the step 3 is preferably a polymerizable surfactant and more preferably the same polymerizable surfactant as that used in the step 1.

<23> The process for producing a colored fine particle dispersion according to any one of the aspects <1> to <22>, wherein the step 3 is the step of mixing the dispersion 2 and the polymerizable monomer including a hydrophobic vinyl-based monomer to conduct the emulsion polymerization.

<24> The process for producing a colored fine particle dispersion according to any one of the aspects <1> to <23>, wherein a proportion of the polymerizable surfactant used in the emulsion polymerization is preferably not less than 5% by mass and more preferably not less than 20% by mass, and is also not more than 100% by mass, on the basis of a whole amount of the surfactants used therein (polymerizable surfactant+the other surfactant).

<25> The process for producing a colored fine particle dispersion according to any one of the aspects <1> to <24>, wherein an amount of the surfactants used in the emulsion polymerization is preferably not less than 3 parts by mass, more preferably not less than 4 parts by mass and even more preferably not less than 5 parts by mass, and is also preferably not more than 20 parts by mass, more preferably not more than 15 parts by mass and even more preferably not more than 12 parts by mass, on the basis of 100 parts by mass of the polymerizable monomer used in the emulsion polymerization in the step 3.

<26> The process for producing a colored fine particle dispersion according to any one of the aspects <1> to <25>, wherein the polymerizable monomer includes the hydrophobic vinyl-based monomer that contains at least a hydrophobic group and a polymerizable group in a structure thereof, the hydrophobic group is at least one group selected from the group consisting of an aliphatic hydrocarbon group, an alicyclic hydrocarbon group and an aromatic hydrocarbon group, and the polymerizable group is at least one group selected from the group consisting of a vinyl group, an allyl group, an acryloyl group, a methacryloyl group, a propenyl group, a vinylidene group and a vinylene group.

<27> The process for producing a colored fine particle dispersion according to the aspect <26>, wherein the hydrophobic vinyl-based monomer is at least one monomer selected from the group consisting of a (meth)acrylic aid ester and an aromatic ring-containing hydrophobic monomer.

<28> The process for producing a colored fine particle dispersion according to any one of the aspects <1> to <27>, wherein an amount of the polymerizable monomer used in the emulsion polymerization is preferably not less than 1% by mass, more preferably not less than 10% by mass and even more preferably not less than 15% by mass, and is also preferably not more than 60% by mass, more preferably not more than 40% by mass and even more preferably not more than 25% by mass, on the basis of the whole reaction system used in the emulsion polymerization reaction.

<29> The process for producing a colored fine particle dispersion according to any one of the aspects <1> to <28>, wherein a mass ratio of the polymerizable monomer to the pigment (polymerizable monomer/pigment) upon the emulsion polymerization is preferably from 90/10 to 10/90, more preferably from 80/20 to 20/80 and even more preferably from 75/25 to 40/60.

<30> A process for producing a water-based ink for ink-jet printing, including the step of mixing the colored fine particle dispersion produced by the process according to any one of the aspects <1> to <29> and an organic solvent B.

<31> The process for producing a water-based ink for ink-jet printing according to the aspect <30>, wherein the organic solvent B is at least one compound selected from the group consisting of polyhydric alcohols, polyhydric alcohol alkyl ethers, nitrogen-containing heterocyclic compounds, amides, amines and sulfur-containing compounds, preferably at least one compound selected from the group consisting of polyhydric alcohols and polyhydric alcohol alkyl ethers, and more preferably polyhydric alcohol(s).

<32> The process for producing a water-based ink for ink-jet printing according to the aspect <31>, wherein a content of the at least one compound selected from the group consisting of polyhydric alcohols and polyhydric alcohol alkyl ethers in the organic solvent B is preferably not less than 80% by mass, more preferably not less than 90% by mass, even more preferably not less than 95% by mass, further even more preferably substantially 100% by mass and still further even more preferably 100% by mass.

<33> A colored fine particle dispersion produced by the process according to any one of the aspects <1> to <29>, wherein the dispersion includes colored fine particles having an average particle size of not less than 10 nm and not more than 300 nm.

30<34> The colored fine particle dispersion according to the aspect <33>, wherein a content (solid content) of the colored fine particles in the colored fine particle dispersion is preferably not less than 10% by mass, more preferably not less than 15% by mass, even more preferably not less than 20% by mass and further even more preferably not less than 25% by mass, and is also preferably not more than 60% by mass, more preferably not more than 55% by mass and even more preferably not more than 50% by mass.

<35> A use of the colored fine particle dispersion according to the aspect <33> or <34> as a colorant for a water-based ink for ink-jet printing.

EXAMPLES

In the following Production Examples, Examples and Comparative Examples, the "part(s)" and "%" indicate "part(s) by mass" and "% by mass", respectively, unless otherwise specified.

(1) Measurement of Average Particle Sizes of Dispersed Particles in Dispersion, Colored Fine Particle Dispersion and Water-Based Ink The average particle size of the dispersed particles in the respective dispersions and ink was measured using a laser particle analyzing system "ELS-8000" (cumulant analysis) available from Otsuka Electronics Co., Ltd. The measurement was conducted under the conditions including a temperature of 25° C., an angle between incident light and a detector of 90° and a cumulative number of 100 times, and a refractive index of water (1.333) was input to the analyzing system as a refractive index of the dispersing medium. In the measurement, the concentration of the dispersion was adjusted to $5 \times 10^{-3}$% by mass (in terms of a solid content).

(2) Measurement of Solid Contents of Dispersion and Colored Fine Particle Dispersion Using an infrared moisture meter "FD-230" (tradename) available from Kett Electric Laboratory, 5 g of an aqueous dispersion was dried at a drying temperature of 150° C. under a measuring mode 96 (monitoring time: 2.5 minutes/variation range: 0.05%) to measure a water content on a wet base (% by mass) of the aqueous dispersion. The solid content of the aqueous dispersion was calculated according to the following formula:

Solid Content (% by mass)=100−Water Content on Wet Base (% by mass) of Aqueous Dispersion (3) Measurement of Viscosity of Water-Based Ink The viscosity of the water-based ink was measured at 25° C. using an E-type viscometer "Model No. TV-25" (using a standard cone rotor (1° 34'×R24); rotating speed: 50 rpm) available from Toki Sangyo Co., Ltd. The data obtained in this measurement were used as data for the below-mentioned storage stability test.

(4) Measurement of Static Surface Tension of Water-Based Ink

A platinum plate was dipped in 5 g of the water-based ink adjusted to a temperature of 20° C. and filled in a cylindrical polyethylene vessel (3.6 cm in diameter×1.2 cm in depth), and the static surface tension of the water-based ink was measured using a surface tension meter "CBVP-Z" available from Kyowa Interface Science Co., Ltd., by Wilhelmy method.

(5) Measurement of pH of Water-Based Ink

The pH value of the water-based ink at 25° C. was measured using a bench-top pH meter "F-71" available from Horiba Ltd., equipped with a pH electrode "6337-10D" available from Horiba Ltd.

Examples 1 to 6

<Production of Colored Fine Particle Dispersion by Emulsion Polymerization>

(Pigment Dispersing Step: Step 1)

A polyethylene vessel was charged with a polymerizable surfactant, ion-exchanged water, methyl ethyl ketone and a pigment ("Pigment Blue 15:3") as shown in "Charged Composition for Pigment Dispersion" in Table 1-1, and the contents of the polyethylene vessel were subjected to dispersion treatment at 4000 rpm for 1 hour while cooling in an ice bath at 0° C. Then, the obtained mixture was mixed with 90 parts by mass of ion-exchanged water, and subjected to dispersion treatment under a pressure of 150 MPa by passing through a disperser "MICROFLUIDIZER Model No. M-110EH-30XP" (tradename) available from Microfluidics Corporation 15 times. The resulting dispersion was diluted with ion-exchanged water until the solid content of the dispersion was reduced to 15% by mass.

(Organic Solvent Removal Step: Step 2)

Then, the thus obtained diluted dispersion was treated at 60° C. under reduced pressure using an evaporator to remove methyl ethyl ketone therefrom and concentrate the dispersion into a predetermined solid content, thereby obtaining a pigment dispersion (solid content: 25%). The average particle size of the particles in the thus obtained dispersion 2 is shown in Table 1-1. Meanwhile, the values shown in Table 1-1 represent "part(s) by mass", and the values as shown in the subsequent Tables are also defined in the same way.

(Emulsion Polymerization Step: Step 3)

A glass vessel was charged with a vinyl-based monomer, potassium persulfate, a polymerizable surfactant and ion-exchanged water as shown in "Charged Composition for Pre-Emulsion" in Table 1-2, and the contents of the glass vessel were stirred using a Teflon (registered trademark) stirring blade at 500 rpm for 30 minutes, thereby obtaining a pre-emulsion.

A separable flask was charged with the pigment dispersion and ion-exchanged water as shown in "Initially Charged Composition for Colored Fine Particle Dispersion" in Table 1-3, and the contents of the flask were heated to 80° C. in a hot water bath while stirring at 250 rpm. After the temperature of the dispersion in the flask reached 80° C., a whole amount of the pre-emulsion previously prepared above as shown in Table 1-2 was added dropwise thereinto over 2 hours. After completion of the dropwise addition of the pre-emulsion, the resulting mixture was aged at 80° C. for 4 hours, thereby obtaining colored fine particle dispersions. Properties of the thus obtained colored fine particle dispersions are shown in Table 1-3.

Examples 7 and 8

The same procedure as in Example 1 was repeated except for using acetone or isopropyl alcohol in place of methyl ethyl ketone in the step 1, thereby obtaining colored fine particle dispersions. Properties of the thus obtained colored fine particle dispersions are shown in Table 1-3.

Comparative Example 1

The same procedure as in Example 1 was repeated except that no methyl ethyl ketone was added in the step 1 to adjust a solid content of the resulting pigment dispersion to 25% by mass, and the step 2 was not conducted, thereby obtaining a colored fine particle dispersion. Properties of the thus obtained colored fine particle dispersion are shown in Table 1-3.

TABLE 1-1

Charged Composition for Pigment Dispersion/Evaluation Results

| | | | Example 1 | Example 2 | Example 3 | Example 4 | Example 5 |
|---|---|---|---|---|---|---|---|
| No. of pigment dispersion | | kind*[1] | PD-1 | PD-2 | PD-3 | PD-4 | PD-5 |
| Step 1: initially charged composition | Polymerizable surfactant | | Compound (a) | Compound (a) | Compound (a) | Compound (a) | KH-5 |
| | | part(s) by mass | 44.4 | 44.4 | 44.4 | 44.4 | 8.9 |
| | Ion-exchanged water | part(s) by mass | 196.3 | 218.4 | 169.6 | 148.4 | 231.9 |
| | Methyl ethyl ketone | part(s) by mass | 34.8 | 12.7 | 61.5 | 82.8 | 34.8 |
| | Acetone | part(s) by mass | — | — | — | — | — |
| | Isopropyl alcohol | part(s) by mass | — | — | — | — | — |
| | Pigment (P.B. 15:3) | part(s) by mass | 80.0 | 80.0 | 80.0 | 80.0 | 80.0 |
| Organic solvent/water | | mass ratio | 0.15 | 0.05 | 0.30 | 0.45 | 0.15 |

TABLE 1-1-continued

Charged Composition for Pigment Dispersion/Evaluation Results

| | | | | | | | |
|---|---|---|---|---|---|---|---|
| Step 2 | Removal of organic solvent | | Done | Done | Done | Done | Done |
| Properties of dispersion 2 | Average particle size | nm | 95.0 | 112.0 | 96.0 | 159.0 | 90.2 |
| | Solid content | % | 25.0 | 25.0 | 25.0 | 25.0 | 25.0 |

| | | | Example 6 | Comparative Example 1 | Example 7 | Example 8 |
|---|---|---|---|---|---|---|
| No. of pigment dispersion | | | PD-6 | PD-7 | PD-8 | PD-9 |
| Step 1: initially charged composition | Polymerizable surfactant | kind*[1] | KH-10 | Compound (a) | Compound (a) | Compound (a) |
| | | part(s) by mass | 8.9 | 44.4 | 44.4 | 44.4 |
| | Ion-exchanged water | part(s) by mass | 231.9 | 231.1 | 196.3 | 196.3 |
| | Methyl ethyl ketone | part(s) by mass | 34.8 | — | — | — |
| | Acetone | part(s) by mass | — | — | 34.8 | — |
| | Isopropyl alcohol | part(s) by mass | — | — | — | 34.8 |
| | Pigment (P.B. 15:3) | part(s) by mass | 80.0 | 80.0 | 80.0 | 80.0 |
| Organic solvent/water | | mass ratio | 0.15 | 0.00 | 0.15 | 0.15 |
| Step 2 | Removal of organic solvent | | Done | None | Done | Done |
| Properties of dispersion 2 | Average particle size | nm | 86.0 | 346.0 | 136.4 | 141.5 |
| | Solid content | % | 25.0 | 25.0 | 25.0 | 25.0 |

Note
*[1]Compound (a) was used in the form of an aqueous solution having a solid content of 20% by mass; KH-5 and KH-10 had a solid content of 100% by mass.

TABLE 1-2

Charged Composition for Pre-Emulsion

| No. of pre-emulsion | | | EC-1 | EC-2 | EC-3 | EC-4 | EC-5 |
|---|---|---|---|---|---|---|---|
| Charged composition for pre-emulsion *2 | Methacrylic acid | part(s) by mass (mass %) | 1.25 (2.5) | 1.25 (2.5) | 1.25 (2.5) | 1.25 (2.5) | 1.25 (2.5) |
| | Methyl methacrylate | part(s) by mass (mass %) | 27.50 (55.0) | 27.50 (55.0) | 27.50 (55.0) | 27.50 (55.0) | 27.50 (55.0) |
| | Styrene | part(s) by mass (mass %) | 8.75 (17.5) | 8.75 (17.5) | 8.75 (17.5) | 8.75 (17.5) | 8.75 (17.5) |
| | 2-Ethylhexyl acrylate | part(s) by mass (mass %) | 12.5 (25.0) | 12.5 (25.0) | 12.5 (25.0) | 12.5 (25.0) | 12.5 (25.0) |
| | Potassium persulfate (KPS) | part(s) by mass | 0.10 | 0.10 | 0.10 | 0.10 | 0.10 |
| | Surfactant | kind*[3] | Compound (a) | Compound (a) | Compound (a) | Compound (a) | KH-5 |
| | | part(s) by mass | 7.50 | 7.50 | 7.50 | 7.50 | 1.50 |
| | Ion-exchanged water | part(s) by mass | 21.50 | 21.50 | 21.50 | 21.50 | 27.50 |

| No. of pre-emulsion | | | EC-6 | EC-7 | EC-8 | EC-9 |
|---|---|---|---|---|---|---|
| Charged composition for pre-emulsion *2 | Methacrylic acid | part(s) by mass (mass %) | 1.25 (2.5) | 1.25 (2.5) | 1.25 (2.5) | 1.25 (2.5) |
| | Methyl methacrylate | part(s) by mass (mass %) | 27.50 (55.0) | 27.50 (55.0) | 27.50 (55.0) | 27.50 (55.0) |
| | Styrene | part(s) by mass (mass %) | 8.75 (17.5) | 8.75 (17.5) | 8.75 (17.5) | 8.75 (17.5) |
| | 2-Ethylhexyl acrylate | part(s) by mass (mass %) | 12.5 (25.0) | 12.5 (25.0) | 12.5 (25.0) | 12.5 (25.0) |
| | Potassium persulfate (KPS) | part(s) by mass | 0.10 | 0.10 | 0.10 | 0.10 |
| | Surfactant | kind*[3] | KH-10 | Compound (a) | Compound (a) | Compound (a) |
| | | part(s) by mass | 1.50 | 7.50 | 7.50 | 7.50 |
| | Ion-exchanged water | part(s) by mass | 27.50 | 21.50 | 21.50 | 21.50 |

Note
*2: The numeral values in parentheses indicate ratios based on a whole amount of the polymerizable monomer (mass %).
*[3]Compound (a) was used in the form of an aqueous solution having a solid content of 20% by mass, KH-5 and KH-10 had a solid content of 100% by mass.

TABLE 1-3

Initially Charged Composition for Colored Fine Particle Dispersion/Evaluation Results

| | Step 3: | | Example 1 | Example 2 | Example 3 | Example 4 | Example 5 |
|---|---|---|---|---|---|---|---|
| | Pre-emulsion | kind | EC-1 | EC-2 | EC-3 | EC-4 | EC-5 |
| Initially charged composition | Pigment dispersion | kind | PD-1 | PD-2 | PD-3 | PD-4 | PD-5 |
| | | part(s) by mass | 100.00 | 100.00 | 100.00 | 100.00 | 100.00 |
| | Ion-exchanged water | part(s) by mass | 72.50 | 72.50 | 72.50 | 72.50 | 72.50 |
| Properties of colored fine particle dispersion | Average particle size | nm | 97.0 | 120.0 | 102.0 | 189.0 | 105.0 |
| | Solid content | % | 30.0 | 30.0 | 30.0 | 30.0 | 30.0 |

| | Step 3: | | Example 6 | Comparative Example 1 | Example 7 | Example 8 |
|---|---|---|---|---|---|---|
| | Pre-emulsion | kind | EC-6 | EC-7 | EC-8 | EC-9 |
| Initially charged composition | Pigment dispersion | kind | PD-6 | PD-7 | PD-8 | PD-9 |
| | | part(s) by mass | 100.00 | 100.00 | 100.00 | 100.00 |
| | Ion-exchanged water | part(s) by mass | 72.50 | 72.50 | 72.50 | 72.50 |
| Properties of colored fine particle dispersion | Average particle size | nm | 100.0 | 401.0 | 142.5 | 148.6 |
| | Solid content | % | 30.0 | 30.0 | 30.0 | 30.0 |

As shown in Table 1-3, it was confirmed that the colored fine particle dispersions obtained in Examples 1 to 8 contained colored fine particles having a small average particle size as compared to the colored fine particle dispersion obtained in Comparative Example 1 in which no methyl ethyl ketone was used, and the step 2 (organic solvent removal step) was not conducted.

Meanwhile, in the case where the colored fine particle dispersion was produced by the same method as in Example 1 except that the step 2 (organic solvent removal step) was not conducted, it was confirmed that the resin particles produced by the emulsion polymerization in the step 3 were coalesced together, and therefore the particles contained in the thus obtained colored fine particle dispersion had a large average particle size as compared to those obtained in Examples 1 to 8.

Meanwhile, the details of the polymerizable surfactants shown in Table 1-1 and Table 1-2 are as follows.

Compound (a): Compound represented by the following general formula (1) which was used in the form of a 20% by mass aqueous solution. The process for producing the compound (a) is described in the below-mentioned Synthesis Example 1. The amount of the compound (a) is shown in terms of an amount of an aqueous solution thereof in Table 1-1 and Table 1-2.

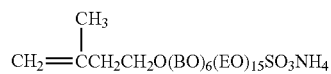

(1)

wherein BO is a butyleneoxy group; and EO is an ethyleneoxy group.

Synthesis Example 1

A reaction vessel equipped with a stirrer, a thermometer and a dropping funnel was charged with 310 g (3.6 mol) of 3-methyl-3-buten-1-ol available from Tokyo Chemical Industry Co., Ltd., followed by cooling the contents of the reaction vessel to 10° C. in a nitrogen atmosphere. Then, 10.22 g (0.0723 mol) of a boron trifluoride diethyl ether complex available from Wako Pure Chemical Industries, Ltd., was added to the reaction vessel, and then 1557.94 g (21.6 mol) of 1,2-epoxybutane(butyleneoxide) was added dropwise to the reaction vessel at a temperature of 7 to 10° C. After completion of the dropwise addition, the contents of the reaction vessel were aged at 10° C. for 1 hour. In addition, 32.0 g of an adsorbent "KYOWAAD 500SH" available from Kyowa Chemical Industry Co., Ltd., was added to the reaction vessel, and the contents of the reaction vessel were stirred at room temperature for 1 hour, and then subjected to filtration under reduced pressure, thereby obtaining an adduct of 3-methyl-3-buten-1-ol with 6 mol of 1,2-epoxybutane.

The thus obtained adduct of 3-methyl-3-buten-1-ol with 6 mol of 1,2-epoxybutane was charged together with 7.26 g (0.134 mol) of powdery sodium methoxide into an autoclave, and then 2379 g (54 mol) of ethyleneoxide was added thereto at 130° C. under 0.3 MPa. Next, 84.7 g of a part of the resulting reaction mixture and 9.60 g of amidosulfuric acid were charged into a reaction vessel equipped with a stirrer and a thermometer, and reacted with each other at 120° C. for 90 minutes in a nitrogen atmosphere to obtain a sulfated reaction product. Then, the resulting reaction solution was subjected to filtration under pressure to remove the unreacted amidosulfuric acid therefrom, followed by diluting the resulting solution with ion-exchanged water to adjust a solid content thereof to 20% by mass, thereby obtaining an aqueous solution of the compound (a).

KH-5: "ACUALON KH-5" (tradename; solid content: 100% by mass) available from DSK Co., Ltd.; a mixture of a compound represented by the following general formula (2) in which R is an alkyl group having 10 carbon atoms and n is 5, and a compound represented by the following general formula (2) in which R is an alkyl group having 12 carbon atoms and n is 5.

KH-10; "ACUALON KH-10" (tradename; solid content: 100% by mass) available from DSK Co., Ltd.; a mixture of a compound represented by the following general formula (2) in which R is an alkyl group having 10 carbon atoms and n is 10, and a compound represented by the following general formula (2) in which R is an alkyl group having 12 carbon atoms and n is 10.

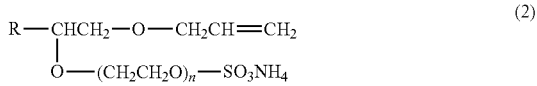

(2)

Examples 2-1 to 2-8 and Comparative Example 2-1

<Preparation of Printing Ink>

A glass vessel was charged with the colored fine particle dispersion, a 1 N sodium hydroxide aqueous solution and ion-exchanged water as shown in Table 2, and the contents of the glass vessel were stirred for 10 minutes using a magnetic stirrer, thereby obtaining a mixture A.

Separately, a glass vessel was charged with propylene glycol, diethylene glycol monoisobutyl ether and a polyether-modified silicone "KF-6011" available from Shin-Etsu Chemical Industry Co., Ltd., as shown in Table 2, and the contents of the glass vessel were stirred for 10 minutes using a magnetic stirrer, thereby obtaining a mixture B.

While stirring the mixture A, the mixture B was added thereto, and the resulting mixture was continuously stirred as such for 1 hour. Thereafter, the mixture was subjected to filtration through a 5 μm disposable membrane filter "Minisart" available from Sartorius Inc., thereby obtaining a water-based ink for evaluation. Properties of the thus obtained water-based ink for evaluation are shown in Table 2.

Meanwhile, Comparative Example 2-1 is an example in which the pigment dispersion PD-7 obtained by using no methyl ethyl ketone in the step 1 and conducting no step 2 (organic solvent removal step) as shown in Comparative Example 1 was used.

The storage stability of the ink was also evaluated by the following method. The results are shown in Table 2.
(Storage Stability of Ink)

The water-based ink prepared above was filled in a closed vessel and subjected to a storage test in a 60° C. thermostatic chamber. After the elapse of each of 3 days, 1 week and 2 weeks, the ink was taken out from the vessel to measure an average particle size of particles in the ink and thereby observe the change in particle size of the particles from an initial stage of the storage. The rate of change in average particle size was calculated according to the following formula (round down to the nearest decimal). The storage stability of the water-based ink was evaluated according to the following ratings.
[Evaluation Ratings]

Rate of Change in Average Particle Size (%)=[(Average Particle Size After Storage)/(Average Particle Size Before Storage)]×100

Change in Average Particle Size (%)=[100−[(Average Particle Size After Storage)/(Average Particle Size Before Storage)]×100]

A: Absolute value of change in average particle size after being stored at 60° C. for 3 days was less than 10%.

A−: Absolute value of change in average particle size after being stored at 60° C. for 3 days was not less than 10% and less than 15%.

B: Absolute value of change in average particle size after being stored at 60° C. for 3 days was not less than 15% and less than 20%.

C: Absolute value of change in average particle size after being stored at 60° C. for 3 days was not less than 20%, or the ink had no flowability, and the measurement of an average particle size of particles therein was impossible.

Next, using the thus prepared ink for evaluation, the ink-jet printed material as described in the below-mentioned item (1) was produced and evaluated for rub fastness thereof by the method described in the below-mentioned item (2). In addition, the thus prepared ink for evaluation was further evaluated for gloss thereof as described in the below-mentioned item (3). The results are shown in Table 2.
(1) Production of Ink-Jet Printed Material The ink for evaluation was applied onto a white polyester film "TETRON U2" (thickness: 125 μm) available from Teijin DuPont Films Japan Ltd., using a wire bar #8 (wet film thickness: 18.3 μm), and the resulting printed material was heated and dried on a hot plate at 60° C. for 10 minutes.
(2) Rub Fastness Test for Printed Material The above-obtained printed material was subjected to a rub fastness test in which printed characters or images on the printed material were rubbed with a cotton "BEMCOT M-3" available from Asahi Kasei Corp., as a friction material using "Sutherland-type Ink Rub Tester AB-201" available from Tester Sangyo Co., Ltd., under a load of 2000 g 100 times (reciprocating operations). The rubbed printed characters or images were observed by the naked eyes and evaluated for rub fastness thereof according to the following ratings.
[Evaluation Ratings]

A: No print defects were observable by naked eyes, and therefore rub fastness of the printed characters or images was very good.

A−: Print defects were observable by naked eyes, but no exposure of the surface of the film was caused in the rubbed portions, and therefore there was present no significant problem concerning rub fastness of the printed characters or images.

B: Print defects were observable by naked eyes, and exposure of the surface of the film was caused in less than 30% of the rubbed portions, and therefore there was present some problem concerning rub fastness of the printed characters or images.

C: Exposure of the surface of the film was caused in not less than 30% of the rubbed portions, and therefore there was present significant problem concerning rub fastness of the printed characters or images.
(3) Gloss The 60° gloss of the aforementioned coated material was measured 5 times by a gloss meter "HANDY GLOSSMETER, Model No.: PG-1" available from Nippon Denshoku Industries Co., Ltd., to obtain an average value of the five measured gloss values. The larger average value indicates a higher gloss. Meanwhile, the gloss of the white polyester film singly onto which no ink was applied was 54.5.

TABLE 2

Compounding of Ink/Evaluation Results

|  |  |  | Example 2-1 | Example 2-2 | Example 2-3 | Example 2-4 | Example 2-5 |
|---|---|---|---|---|---|---|---|
| Colored fine particle dispersion |  | Production Example | Example 1 | Example 2 | Example 3 | Example 4 | Example 5 |
|  |  | Pigment dispersion | PD-1 | PD-2 | PD-3 | PD-4 | PD-5 |
|  |  | part(s) by mass | 38.89 | 38.89 | 38.89 | 38.89 | 38.89 |
|  | Propylene glycol | part(s) by mass | 27.00 | 27.00 | 27.00 | 27.00 | 27.00 |
|  | Dibutylene glycol monoisobutyl ether | part(s) by mass | 5.00 | 5.00 | 5.00 | 5.00 | 5.00 |
|  | KF-6011*[1] | part(s) by mass | 0.50 | 0.50 | 0.50 | 0.50 | 0.50 |
|  | 1N NaOH aqueous solution | part(s) by mass | 0.60 | 0.60 | 0.60 | 0.60 | 0.60 |
|  | Ion-exchanged water | part(s) by mass | 28.01 | 28.01 | 28.01 | 28.01 | 28.01 |
| Water-based ink | Average particle size | nm | 99 | 124 | 103 | 199 | 105 |
|  | Viscosity at 25° C. | mPa·s | 5.3 | 5.4 | 5.3 | 5.1 | 5.2 |
|  | Surface tension | mN/m | 29.8 | 29.9 | 29.5 | 29.9 | 29.8 |
|  | pH | — | 8.9 | 9.1 | 8.8 | 8.8 | 9.0 |
|  | Storage stability | — | A | A | A | C | A |
|  | Rate of change in average particle size | % | 99 | 105 | 105 | 79 | 108 |
|  | Change in average particle size (absolute value) | % | 1 | 5 | 5 | 21 | 8 |
| Printed material | Rub fastness | — | A | A– | A | B | A |
|  | 60° Gloss |  | 52.2 | 48.4 | 51.3 | 23.4 | 52.1 |

|  |  |  | Example 2-6 | Comparative Example 2-1 | Example 2-7 | Example 2-8 |
|---|---|---|---|---|---|---|
| Colored fine particle dispersion |  | Production Example | Example 6 | Comparative Example 1 | Example 7 | Example 8 |
|  |  | Pigment dispersion | PD-6 | PD-7 | PD-8 | PD-9 |
|  |  | part(s) by mass | 38.89 | 38.89 | 38.89 | 38.89 |
|  | Propylene glycol | part(s) by mass | 27.00 | 27.00 | 27.00 | 27.00 |
|  | Dibutylene glycol monoisobutyl ether | part(s) by mass | 5.00 | 5.00 | 5.00 | 5.00 |
|  | KF-6011*[1] | part(s) by mass | 0.50 | 0.50 | 0.50 | 0.50 |
|  | 1N NaOH aqueous solution | part(s) by mass | 0.60 | 0.60 | 0.60 | 0.60 |
|  | Ion-exchanged water | part(s) by mass | 28.01 | 28.01 | 28.01 | 28.01 |
| Water-based ink | Average particle size | nm | 104 | 421 | 144 | 150 |
|  | Viscosity at 25° C. | mPa·s | 5.4 | 4.4 | 5.1 | 5.1 |
|  | Surface tension | mN/m | 30.1 | 30.1 | 29.8 | 29.8 |
|  | pH | — | 9.1 | 8.8 | 9.0 | 9.0 |
|  | Storage stability | — | A | C | A | A |
|  | Rate of change in average particle size | % | 107 | 77 | 104 | 105 |
|  | Change in average particle size (absolute value) | % | 7 | 23 | 4 | 5 |
| Printed material | Rub fastness | — | A | C | A– | A– |
|  | 60° Gloss |  | 51.8 | 16.5 | 36.5 | 36.5 |

Note
*[1]Polyether-modified silicone "KF6011" available from Shin-Etsu Chemical Industry Co., Ltd.

It was confirmed that the water-based inks obtained in Examples 2-1 to 2-8 (using the pigment dispersions PD-1 to PD-6, PD-8 and PD-9, respectively) were excellent in rub fastness and gloss as compared to the water-based ink obtained in Comparative Example 2-1 (using the pigment dispersion PD-7 obtained by using no methyl ethyl ketone and conducting no step 2 (organic solvent removal step)).

The invention claimed is:

1. A process for producing a colored fine particle dispersion, comprising the following steps 1 to 4:

Step 1: dispersing a mixed solution comprising a pigment, a polymerizable surfactant, water, and an organic solvent to prepare a dispersion 1 wherein a content of the polymerizable surfactant to the pigment ranges from 1% by mass to 50% by mass and wherein a weight ratio of the organic solvent to the water ranges from 0.05:1 to 0.40:1;

Step 2: removing the organic solvent from the dispersion 1 to prepare a dispersion 2 in which the solid content of the dispersion ranges from 18% by mass to 60% by mass; and wherein a content of the polymerizable surfactant in the dispersion 2 ranges from 0.5% by mass to 30% by mass;

Step 3: providing an emulsion comprising a polymerizable monomer, a polymerizable surfactant, and water and introducing said emulsion into a solution comprising the dispersion 2 to form a polymerizable mixture, wherein an amount of the polymerizable surfactant and other surfactant ranges from 3 parts by mass to 20 parts by mass based upon 100 parts by mass of the polymerizable monomer; and Step 4: conducting emulsion polymerization of said polymerization mixture, thereby producing the colored fine particle dispersion, wherein the polymerizable surfactant comprises a compound represented by the formula (I):

(I)

wherein; BO is a butyleneoxy group; EO is an ethyleneoxy group; M is a cation; m represents an average molar number of addition of BO and is a number of not less than 1 and not more than 10; and n represents an average molar number of addition of EO and is a number of not less than 4 and not more than 25.

2. The process for producing a colored fine particle dispersion according to claim 1, wherein a polymerization initiator is added in the step 3 to conduct the emulsion polymerization.

3. The process for producing a colored fine particle dispersion according to claim 1, wherein the organic solvent is an oxygen atom-containing polar solvent having not less than 1 and not more than 5 carbon atoms.

4. The process for producing a colored fine particle dispersion according to claim 1, wherein the pigment is a pigment subjected to no hydrophilic treatment.

5. The process for producing a colored fine particle dispersion according to claim 1, wherein the step 1 comprises a high-pressure dispersion treatment step.

6. The process for producing a colored fine particle dispersion according to claim 1, wherein the organic solvent comprises at least one organic solvent selected from the group consisting of methanol, ethanol, acetone and methyl ethyl ketone.

7. The process for producing a colored fine particle dispersion according to claim 1, wherein a surfactant is further added in the step 3.

8. The process for producing a colored fine particle dispersion according to claim 7, wherein the surfactant added in the step 3 is a polymerizable surfactant.

9. The process for producing a colored fine particle dispersion according to claim 1, wherein the polymerizable monomer in step 3 comprises a hydrophobic vinyl-based monomer.

10. The process for producing a colored fine particle dispersion according to claim 1, wherein the polymerizable surfactant is capable of being copolymerized with an ethylenically unsaturated monomer, comprises an anionic or nonionic surfactant containing at least one radical-polymerizable unsaturated double bond in a molecule thereof.

11. The process for producing a colored fine particle dispersion according to claim 1, wherein a temperature of the dispersion treatment product upon removing the organic solvent therefrom in the step 2 is not lower than 20° C. and not higher than 80° C.

12. The process for producing a colored fine particle dispersion according to claim 1, wherein a pressure used upon removal of the organic solvent in the step 2 is not less than 0.01 MPa and not more than 0.5 MPa.

13. The process for producing a colored fine particle dispersion according to claim 1, wherein a proportion of the polymerizable surfactant used in the emulsion polymerization is not less than 5% by mass and not more than 100% by mass, on the basis of a whole amount of the surfactants used therein (polymerizable surfactant+the other surfactant).

14. The process for producing a colored fine particle dispersion according to claim 1, wherein the dispersion comprises colored fine particles having an average particle size of not less than 10 nm and not more than 300 nm.

* * * * *